(12) United States Patent
Williams

(10) Patent No.: US 9,410,819 B2
(45) Date of Patent: Aug. 9, 2016

(54) MANAGEMENT SYSTEM FOR AERONAUTICAL INFORMATION

(75) Inventor: Jeffrey Lee Williams, Parker, CO (US)

(73) Assignee: THE BOEING COMPANY, Chicago, IL (US)

( * ) Notice: Subject to any disclaimer, the term of this patent is extended or adjusted under 35 U.S.C. 154(b) by 239 days.

(21) Appl. No.: 13/196,087

(22) Filed: Aug. 2, 2011

(65) Prior Publication Data

US 2013/0036376 A1 Feb. 7, 2013

(51) Int. Cl.
G06F 3/048 (2013.01)
G01C 23/00 (2006.01)

(52) U.S. Cl.
CPC .................................. *G01C 23/00* (2013.01)

(58) Field of Classification Search
CPC ........................................................ G06F 3/048
USPC ........................................................ 715/771
See application file for complete search history.

(56) References Cited

U.S. PATENT DOCUMENTS

| | | | |
|---|---|---|---|
| 5,884,219 A | 3/1999 | Curtwright et al. | |
| 6,128,571 A * | 10/2000 | Ito et al. | 701/426 |
| 6,985,929 B1 | 1/2006 | Wilson et al. | |
| 7,765,060 B1 | 7/2010 | Kennedy | |
| 2003/0018427 A1 * | 1/2003 | Yokota et al. | 701/208 |
| 2004/0225432 A1 * | 11/2004 | Pilley et al. | 701/117 |
| 2006/0217853 A1 | 9/2006 | Servantie et al. | |
| 2007/0106468 A1 * | 5/2007 | Eichenbaum et al. | 701/211 |
| 2008/0042880 A1 * | 2/2008 | Ramaiah | G01C 21/00 340/958 |
| 2010/0280753 A1 | 11/2010 | Chytil et al. | |
| 2010/0309149 A1 * | 12/2010 | Blumenberg et al. | 345/173 |
| 2011/0198436 A1 * | 8/2011 | Liu et al. | 244/19 |
| 2012/0035849 A1 * | 2/2012 | Clark | G01C 23/00 701/467 |

OTHER PUBLICATIONS

European Search Report, dated May 24, 2016, regarding Application No. EP12178297.3, 7 pages.

* cited by examiner

*Primary Examiner* — Peiyong Weng
(74) *Attorney, Agent, or Firm* — Yee & Associates, P.C.

(57) ABSTRACT

A method and apparatus for displaying navigation objects for managing operations of a vehicle. A number of navigation objects for managing the operations of the vehicle is displayed in a graphical user interface to form a display of the number of navigation objects. Responsive to a user input to the number of navigation objects, the display of the number of navigation objects in the graphical user interface is changed to include one or more navigation objects identified based on the user input. The navigation objects in the number of navigation objects have a number of associations with each other. The display of the number of navigation objects includes a number of graphical indicators providing a visualization of the number of associations for the number of navigation objects.

22 Claims, 15 Drawing Sheets

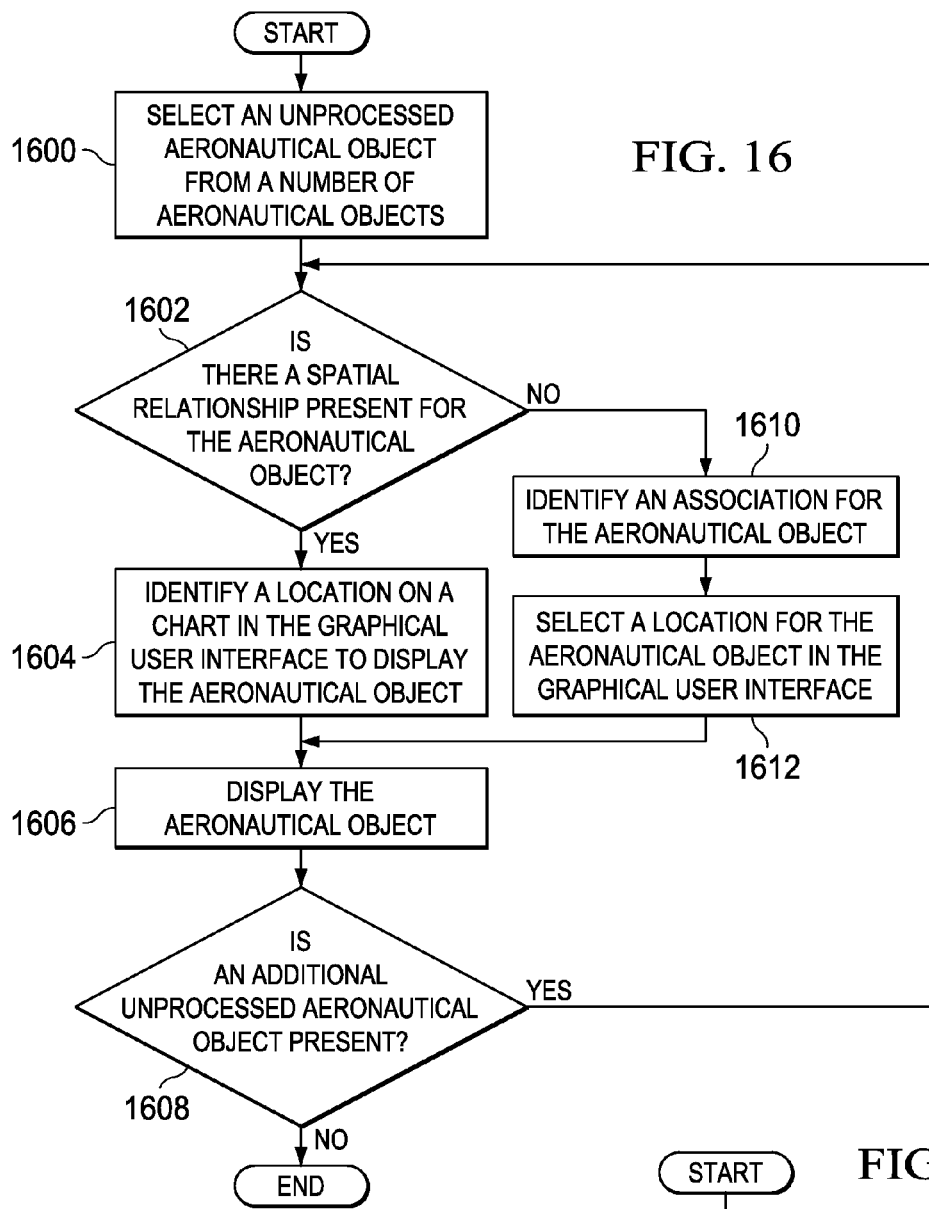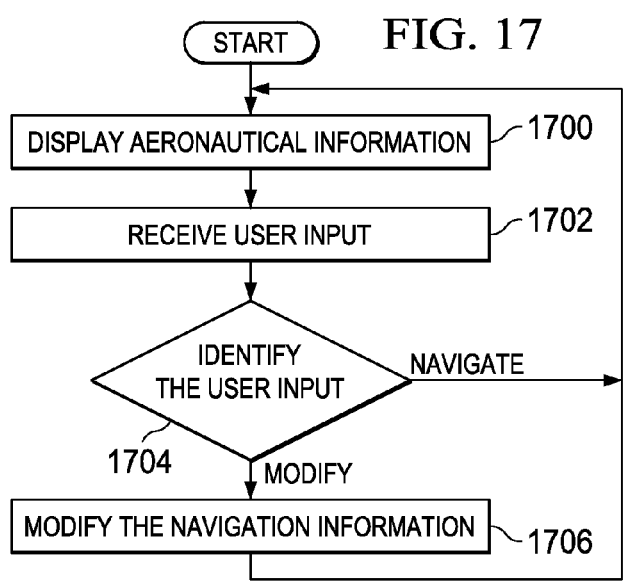

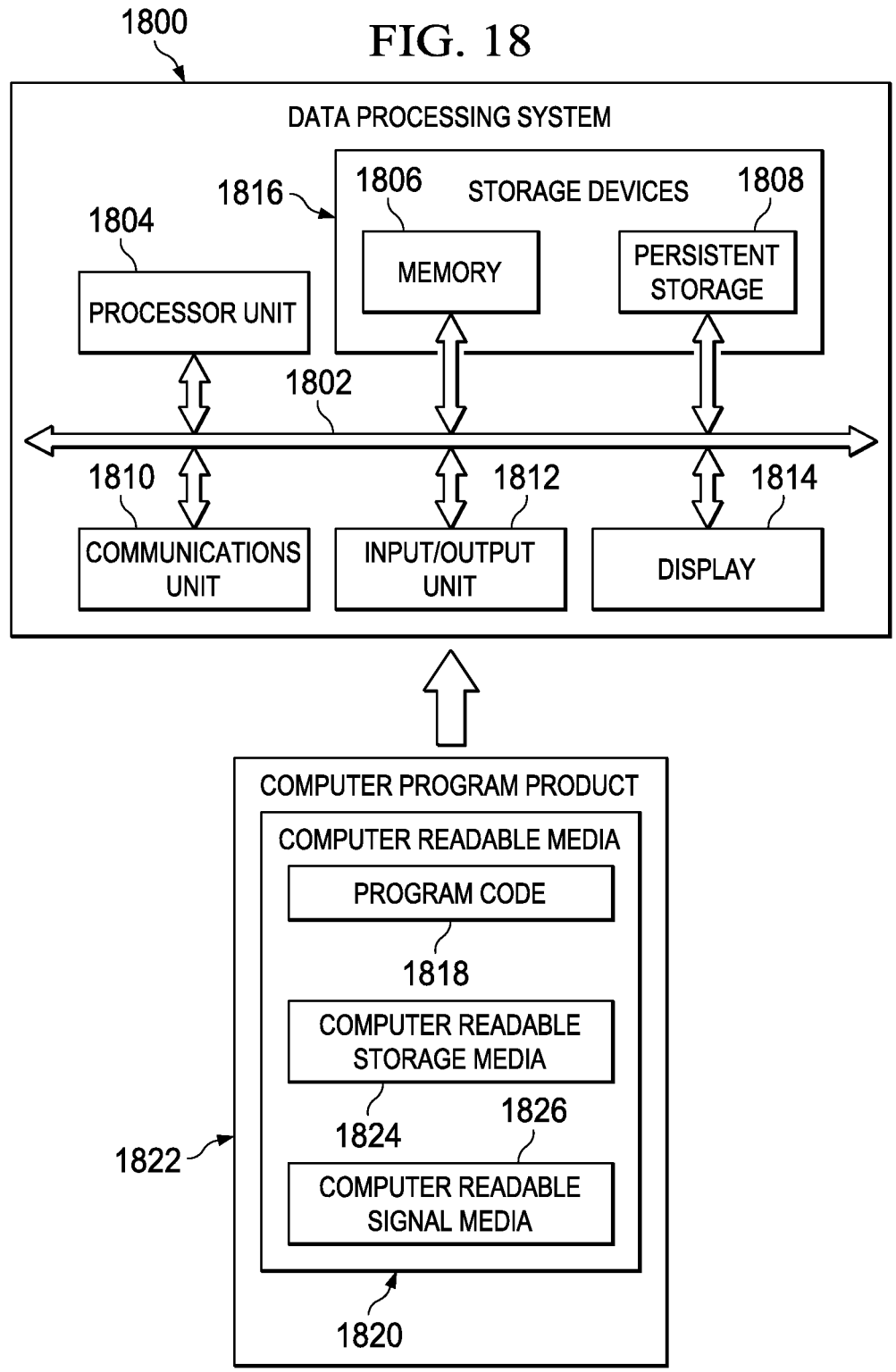

# US 9,410,819 B2

MANAGEMENT SYSTEM FOR AERONAUTICAL INFORMATION

BACKGROUND INFORMATION

1. Field:

The present disclosure relates generally to navigation and, in particular, to navigation information for vehicles. Still more particularly, the present disclosure relates to a method and apparatus for managing a display of aeronautical information.

2. Background:

Pilots rely on charts to operate an aircraft. A chart is a map including information used in the navigation of an aircraft. These charts may include areas over which an aircraft will fly. For example, charts of an airport and the area surrounding the airport also may be present.

These charts include many different types of information. For example, without limitation, the charts may include geographic boundaries, VHF omnidirectional range (VOR) navigation aids, procedures for landing, identification of runways, communications frequencies used by airports, waypoints, and other suitable information. These charts may be in paper or electronic form.

With the numerous amounts and types of information present, identifying information that a pilot needs to operate the aircraft for a particular flight plan or flight path may be difficult to find. A pilot may need to look for information needed for a particular flight plan from information that may not be applicable to the current flight. Information also may include notices to airman (NOTAMs). As a result, more time and effort than desired may be needed to identify information for use in operating an aircraft.

Therefore, it would be illustrative to have a method and apparatus that takes into account at least some of the issues discussed above as well as possibly other issues.

SUMMARY

In one illustrative embodiment, a method for displaying navigation objects for managing operations of a vehicle is provided. A number of navigation objects for managing the operations of the vehicle is displayed in a graphical user interface to form a display of the number of navigation objects. Responsive to a user input to the number of navigation objects, the display of the number of navigation objects in the graphical user interface is changed to include one or more navigation objects identified based on the user input. The navigation objects in the number of navigation objects have a number of associations with each other. The display of the number of navigation objects includes a number of graphical indicators providing a visualization of the number of associations for the number of navigation objects.

In another illustrative embodiment, an apparatus comprises a display system and a computer system. The computer system is configured to display a group of navigation objects for managing operations of a vehicle in a chart within a graphical user interface to form a display of the group of navigation objects. The computer system is further configured to change the display of the group of navigation objects in the chart in the graphical user interface to include the navigation objects having associations with each other based on a user input in response to the user input to the group of navigation objects. The display of the group of navigation objects includes a number of graphical indicators providing a visualization of associations within the group of navigation objects.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and advantages thereof, will best be understood by reference to the following detailed description of an illustrative embodiment of the present disclosure when read in conjunction with the accompanying drawings, wherein:

FIG. 16 is an illustration of a flowchart of a process for displaying aeronautical objects in a graphical user interface in accordance with an illustrative embodiment;

FIG. 17 is an illustration of a flowchart of a process for managing aeronautical information in accordance with an illustrative embodiment; and FIG. 18 is an illustration of a data processing system in accordance with an illustrative embodiment.

DETAILED DESCRIPTION

Figure 1:
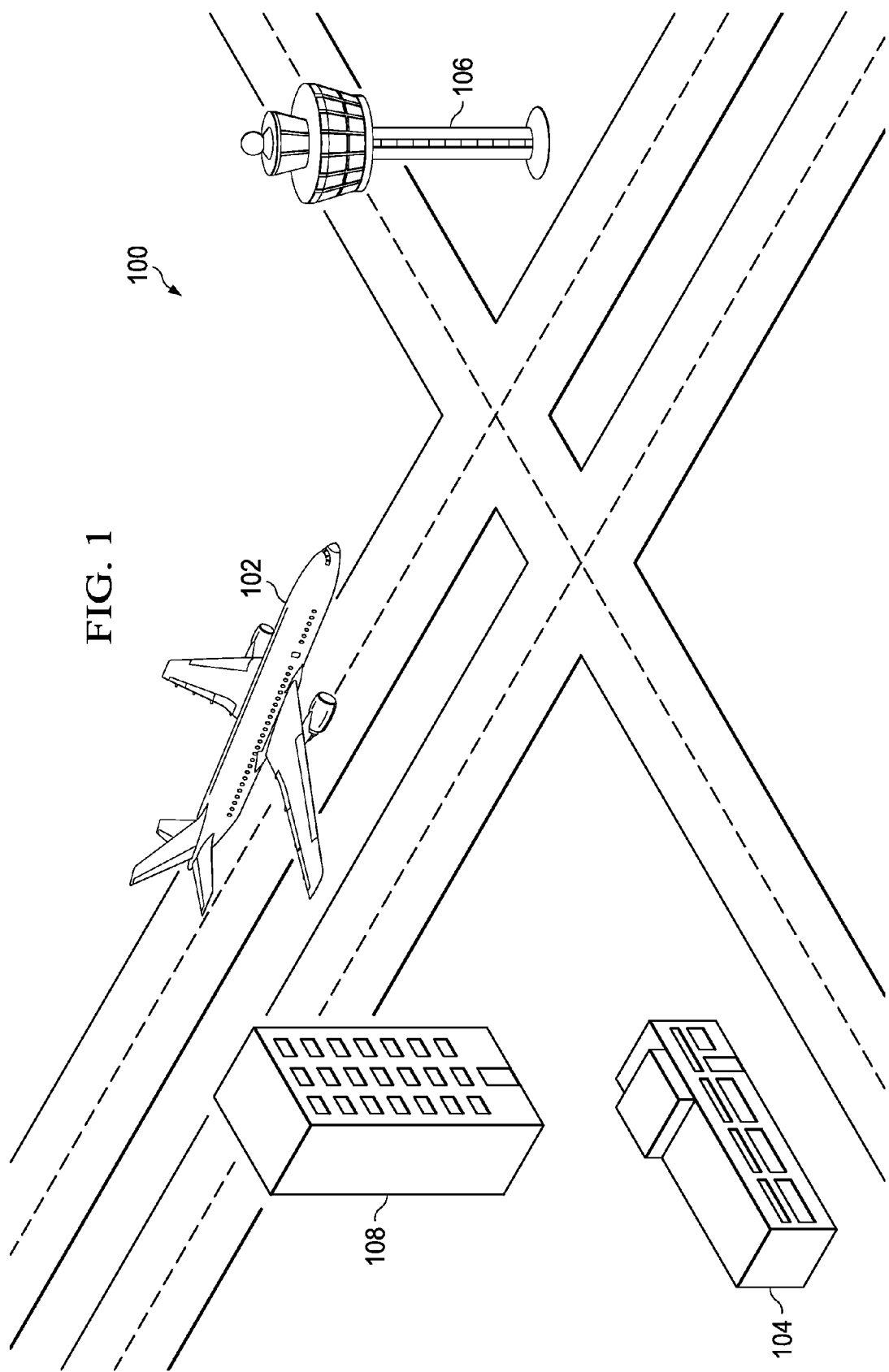
FIG. 1 is an illustration of a navigation information environment in accordance with an illustrative embodiment.

The different illustrative embodiments recognize and take into account a number of different considerations. For example, the different illustrative embodiments recognize and take into account that one manner in which the amounts of information may be reduced for use by a pilot is to place different types of information on different charts.

The different illustrative embodiments recognize and take into account that by placing different types of information on different charts, the amount of information on a particular chart is reduced. This approach, however, may require more effort and time than desired if a pilot needs information that cannot be found from a single chart. As a result, a pilot may need to refer to multiple charts to find the desired information. A pilot may need to switch between screens or paper charts to find the desired information. Also, the pilot has to remember which charts contain which types of information.

The different illustrative embodiments recognize and take into account that another solution involves having a pilot select different types of information for display on a single electronic chart. For example, landing procedures and approaches are two types of information a pilot may select. This approach also reduces the amount of information that may be displayed at any one time. However, information that may not be relevant to a current route for an aircraft is still present. For example, the landing procedures and approaches include ones that may not be used by the pilot for the particular route of the aircraft.

The different illustrative embodiments also recognize and take into account that in making changes to aeronautical information, an operator may analyze the information to identify what changes are to be made. The different illustrative embodiments recognize and take into account that the different associations between aeronautical objects in the aeronautical information may be difficult to track. In particular, the impact of a change on one aeronautical object to other aeronautical objects that may be associated on different hierarchical levels may be more difficult to identify than desired.

Thus the different illustrative embodiments provide a method and apparatus for managing aeronautical information. In one illustrative embodiment, a number of aeronautical objects for managing operations of an aircraft are displayed in a graphical user interface to form a display of the number of aeronautical objects. The display is changed in response to a user input to the number of aeronautical objects. The display of the aeronautical objects in the graphical user interface is changed to include one or more aeronautical objects based on the user input. Aeronautical objects in the number of aeronautical objects have a number of associations with each other and the change in the display includes a number of graphical indicators providing a visualization of the number of associations for the number of aeronautical objects.

As used herein, a number with reference to items means one or more items. For example, a number of aeronautical objects is one or more aeronautical objects.

This type of display of aeronautical objects may be performed in a different manner from the manner in which aeronautical information is currently displayed. The display provides a dynamic view of aeronautical information in which aeronautical information is selected in a manner that allows the operator to view aeronautical information related to an operation that the operators are performing. This view is provided without the operator having to view other information that may be unrelated to the current operation. As a result, the operator may spend less time and effort performing an operation.

With reference now to the figures and in particular with reference to FIG. 1, an illustration of a navigation information environment is depicted in accordance with an illustrative embodiment. As depicted, aeronautical environment 100 includes aircraft 102, dispatching facility 104, air traffic control tower 106, aeronautical information management facility 108, and other suitable locations. Different illustrative embodiments may be used in different locations in aeronautical environment 100.

In one illustrative example, aeronautical information may be displayed in aircraft 102 in accordance with an illustrative embodiment. The display of aeronautical information in aircraft 102 may be made to provide information to a pilot operating aircraft 102. The aeronautical information displayed is aeronautical information that is relevant to the operations performed by the pilot operating aircraft 102. The pilot may navigate through aeronautical information in a manner that reduces a display of undesired aeronautical information in accordance with an illustrative embodiment.

Additionally, aeronautical information also may be displayed in accordance with an illustrative embodiment in dispatching facility 104, air traffic control tower 106, or a combination of the two. A dispatcher in dispatching facility 104 may perform routing and other operations using aeronautical information displayed in accordance with an illustrative embodiment. Air traffic controllers in air traffic control tower 106 may manage traffic and provide instructions to aircraft such as aircraft 102 using aeronautical information displayed in accordance with an illustrative embodiment.

As yet another illustrative example, the aeronautical information displayed using an illustrative embodiment may be displayed in aeronautical information management facility 108. An operator may navigate aeronautical information using an illustrative embodiment. The operator may validate, update, and/or manage the aeronautical information using an illustrative embodiment.

The different illustrative embodiments provide different operators at different locations an ability to see aeronautical information in a manner that requires less time and effort as compared to current systems for displaying aeronautical information. An object is displayed for use in aeronautical objects containing aeronautical information performing different operations such as those illustrated in FIG. 1.

Figure 2:
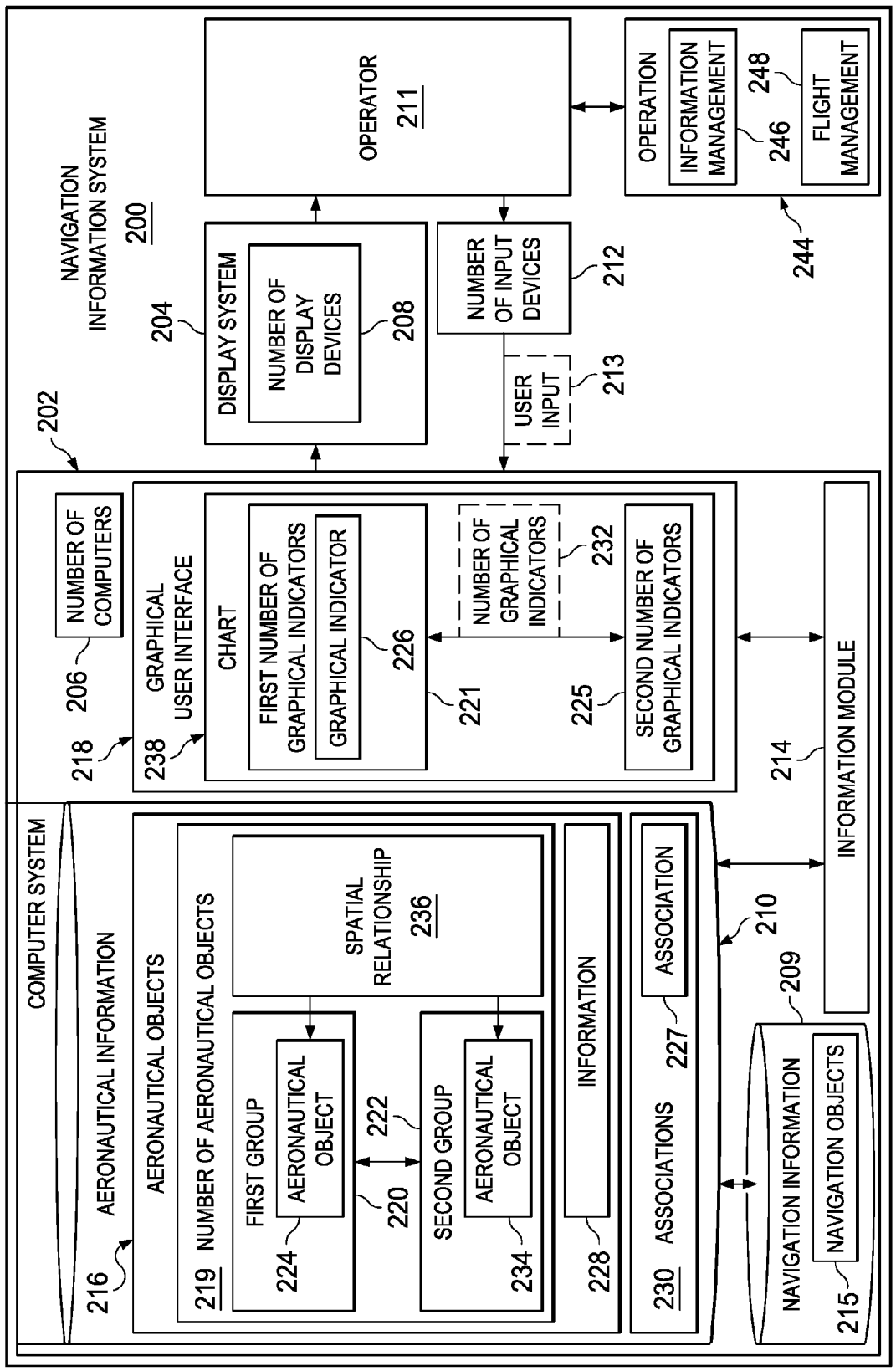
FIG. 2 is an illustration of a block diagram of a navigation information system in accordance with an illustrative embodiment.

With reference now to FIG. 2, an illustration of a block diagram of a navigation information system is depicted in accordance with an illustrative embodiment. Navigation information system 200 is an example of a navigation information system that may be implemented in aeronautical environment 100 in FIG. 1.

In this illustrative example, navigation information system 200 comprises computer system 202 and display system 204. Computer system 202 comprises number of computers 206. In these illustrative examples, when more than one computer is present in computer system 202, those computers may be in communication with each other.

Further, computer system 202 may be in a single location or distributed throughout different locations. For example, computer system 202 may be located in aircraft 102, dispatch facility 104, air traffic control tower 106, aeronautical information management facility 108, or some combination thereof.

Display system 204 comprises number of display devices 208. Display system 204 is configured to display aeronautical information 210.

In these illustrative examples, operator 211 interacts with computer system 202 using number of input devices 212. As depicted, operator 211 generates user input 213 through number of input devices 212. Number of input devices 212 includes at least one of a keyboard, a touch screen, a mouse, a joystick, and other suitable types of input devices.

As used herein, the phrase "at least one of", when used with a list of items, means different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In other examples, "at least one of" may be, for example, without limitation, two of item A, one of item B, and ten of item C; four of item B and seven of item C; and other suitable combinations.

Information module 214 is located in computer system 202 in these illustrative examples. Information module 214 may be hardware, software, or a combination of the two. Information module 214 is configured to display navigation information 209 on display system 204 in accordance with an illustrative embodiment.

In these illustrative examples, navigation information 209 is information used to operate a vehicle. In this one illustrative example, navigation information 209 takes the form of aeronautical information 210. Aeronautical information 210 is information used to operate an aircraft.

Navigation information 209 includes navigation objects 215. A navigation object in navigation objects 215 is a grouping of information in navigation information 210.

In these illustrative examples, navigation objects 215 take the form of aeronautical objects 216. An aeronautical object in aeronautical objects 216 is a grouping of information in aeronautical information 210. The grouping may be, for example, with respect to a particular topic or subject. For example, an aeronautical object may be an airport, a procedure, a waypoint, a navigation aid, a VHF omnidirectional radio (VOR) range station, a runway, a terminal, an aircraft, and other suitable items.

As yet another example, the grouping may be based on a similarity of attributes for aeronautical objects 216. For example, a grouping of aeronautical objects 216 may include runways with hard surfaces.

In these illustrative examples, aeronautical information 210 may be located within computer system 202 or some remote location depending on the particular implementation. For example, aeronautical information 210 may be in a database within computer system 202. In other illustrative examples, aeronautical information 210 may be located in a database or other organizational mechanism in another computer system that is in communication with computer system 202.

As depicted, information module 214 displays aeronautical information 210 in graphical user interface 218 on display system 204. In particular, information module 214 displays number of aeronautical objects 219 from aeronautical objects 216 in graphical user interface 218. Responsive to user input 213, information module 214 changes the display of aeronautical objects 216 in graphical user interface 218. In these illustrative examples, the change in display of aeronautical objects 216 may include adding one or more aeronautical objects identified based on user input 213.

For example, information module 214 displays first group 220 of aeronautical objects 216 in graphical user interface 218 on display system 204. As used herein, a group when used with reference to items means one or more items. For example, first group 220 of aeronautical objects 216 is one or more aeronautical objects in number of aeronautical objects 219. In this illustrative example, first group 220 of aeronautical objects 216 is displayed in graphical user interface 218 using first number of graphical indicators 221. First number of graphical indicators 221 is visual representations of first group 220 in aeronautical objects 216.

As depicted, second group 222 of aeronautical objects 216 is displayed in graphical user interface 218 using second number of graphical indicators 225. Second group 222 of aeronautical objects 216 may be additional aeronautical objects in number of aeronautical objects 219. Second number of graphical indicators 225 is a visual representation of the aeronautical objects in second group 222 of aeronautical objects 216.

Second group 222 of aeronautical objects 216 is displayed in graphical user interface 218 in response to user input 213 selecting aeronautical object 224 from first group 220 of aeronautical objects 216. Second group 222 of aeronautical objects 216 has association 227 with aeronautical object 224. Aeronautical object 224 is displayed using graphical indicator 226.

In these illustrative examples, when aeronautical objects are described as being displayed in graphical user interface 218, the aeronautical objects are displayed in graphical user interface 218 using graphical indicators. Various types of graphical indicators may be used. For example, icons, images, and other types of graphics may be used. In these illustrative examples, a selection of an aeronautical object occurs through a selection of the icon representing an aeronautical object that is displayed in graphical user interface 218. In this manner, graphical user interface 218 and the icons displayed in graphical user interface 218 allow for a manipulation or other interaction with aeronautical objects 216.

Information 228 also may be displayed in response to selection of aeronautical object 224. Information 228 is information about aeronautical object 224.

In the illustrative examples, association 227 is just one association within associations 230 in aeronautical information 210. Associations 230 provide an identification of relationships or connections between different aeronautical objects within aeronautical objects 216 in aeronautical information 210.

The association of second group 222 of aeronautical objects 216 to aeronautical object 224 is made using number of graphical indicators 232. Number of graphical indicators 232 identifies association 227 between aeronautical object 224 and second group 222 of aeronautical objects 216. More specifically, number of graphical indicators 232 provides a visual association between first number of graphical indicators 221 and second number of graphical indicators 225 in graphical user interface 218.

In this illustrative example, aeronautical object 224 is displayed in graphical user interface 218 using graphical indicator 226 in first number of graphical indicators 221.

Number of graphical indicators 232 may take a number of different forms. For example, without limitation, number of graphical indicators 232 may include at least one of a line, text, an icon, an arrow, and other suitable types of indicators.

In these illustrative examples, the display of second group 222 of aeronautical objects 216 with respect to aeronautical object 224 in graphical user interface 218 is made in a manner that indicates spatial relationships between the different aeronautical objects in second group 222 and aeronautical object 224. A spatial relationship specifies how an aeronautical object is located in space in relation to another aeronautical object.

For example, aeronautical object 234 in second group 222 of aeronautical objects 216 may be displayed with a spatial relationship 236 with respect to aeronautical object 224 in first group 220 of aeronautical objects 216.

Spatial relationship 236 indicates a location of aeronautical object 234 with respect to aeronautical object 224. In other words, display of aeronautical object 234 is in a location relating to aeronautical object 224 in graphical user interface 218. Thus, the operator may see aeronautical object 234 and aeronautical object 224 in graphical user interface 218 without changing pages or screens.

Further, the display of aeronautical object 234 in the location relative to aeronautical object 224 may be representative of the position and/or distance between physical objects represented by aeronautical object 234 and aeronautical object 224. The display of aeronautical objects 216 also may be displayed with respect to routes or paths that may be taken by an aircraft, as well as boundaries for airspace and other suitable information that may be represented in an aeronautical object in aeronautical objects 216.

For example, if aeronautical object 224 is an airport and aeronautical object 234 is a waypoint, the display of aeronautical object 234 in graphical user interface 218 may be made by displaying graphical indicator 226 on chart 238 in graphical user interface 218.

Chart 238 is a map that includes information. For example, a chart may show at least one of facts, conditions, and geographical aspects used for navigation. In these illustrative examples, a map is a representation of features on the earth or in the sky. Chart 238 is used in operating an aircraft such as aircraft 102 in FIG. 1. In these illustrative examples, the display of aeronautical objects 216 on chart 238 in graphical user interface 218 provides aeronautical information 210 for operator 211.

The location of graphical indicator 226 for aeronautical object 234 may correspond to a geographic location of aeronautical object 234 and its location in chart 238. In a similar fashion, aeronautical object 224 is displayed on chart 238 with respect to its geographic location. As a result, an operator may see spatial relationship 236 between aeronautical object 224 and aeronautical object 234.

If chart 238 is not displayed, aeronautical object 224 may be displayed in graphical user interface 218 in a location with respect to aeronautical object 234. This location may allow for spatial relationship 236 to be identified between these two aeronautical objects. In other words, spatial relationship 236 may not be with reference to geographic coordinates on chart 238. Instead, spatial relationship 236 may rely on the locations of aeronautical object 224 and aeronautical object 234 with respect to each other.

In this manner, operator 211 may use navigation information system 200 in a manner that provides aeronautical information 210 that is relevant to operation 244 being performed by operator 211. The identification of aeronautical information 210 that may be relevant to operation 244 may be performed without seeing other aeronautical information within aeronautical information 210 that may not be of interest in performing operation 244.

In these illustrative examples, operation 244 may take various forms. For example, operation 244 may be information management 246, flight management 248, or other suitable types of operations.

In one illustrative example, information management 246 may include updating, adding, removing, or otherwise changing aeronautical information 210. Flight management 248 may include changing procedures or routes of an aircraft such as aircraft 102 in FIG. 1. Flight management 248 may be performed by an operator located at aeronautical information management facility 108 in FIG. 1 or any other suitable location.

Flight management 248 may include, for example, creating routes, performing calculations, operating an aircraft, and other suitable operations. Flight management 248 may be performed by a dispatcher at dispatch facility 104, an air traffic controller at air traffic control tower 106, a pilot in aircraft 102, or an operator at some other suitable location.

Thus, navigation information system 200 may be used by a pilot before a flight to plan a flight, during a flight, and during other phases of operation of an aircraft. Navigation information system 200 may be used by a dispatcher in dispatch facility 104 to provide information and adjustments to flights as well as planning future flights. Navigation information system 200 may be used by an operator in air traffic control tower 106 to manage air traffic.

In this manner, navigation information system 200 provides a mechanism to navigate and visualize associations between aeronautical objects 216. This visualization and navigation may be performed more easily as compared to currently used charts displaying aeronautical information 210 or as compared to searching for individual aeronautical objects in aeronautical objects 216 and inferring associations between the individual aeronautical objects by manually comparing attributes or spatial relationships.

With navigation information system 200, aeronautical information 210 not selected by operator 211 through user input 213 and aeronautical information 210 not related to information selected through user input 213 is not displayed in graphical user interface 218 by information module 214. As a result, the amount of aeronautical information 210 displayed in graphical user interface 218 may be directed toward information needed by operator 211 to manage the operation of aircraft 102.

In this manner, operator 211 may find and view aeronautical information 210 more efficiently as compared to currently available systems. In particular, this efficiency may occur when operator 211 is capable of finding and viewing aeronautical information 210 without the visual clutter that is present in currently available systems.

The illustration of navigation information system 200 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, navigation information system 200 may be configured to provide information for other types of vehicles in addition to, and/or in place of, aircraft 102. For example, navigation information system 200 may provide navigation information 209 for a vehicle selected from one of an aircraft, a ship, a spacecraft, ground vehicle, and other suitable types of vehicles. Navigation information 209 may be stored in a navigation database or other suitable structure for storing information.

In another illustrative example, navigation information system 200 may be used to generate charts for particular flights. As a result, aeronautical information may be used during planning, during flight, and after a flight in the different illustrative examples.

In yet another illustrative example, a third group of aeronautical objects 216 may be displayed in graphical user interface 218 in addition to first group 220 and second group 222. This third group of aeronautical objects 216 may have an association with second group 222 of aeronautical objects 216. The third group of aeronautical objects may not have a spatial relationship with at least one of aeronautical object 224 and second group 222 of aeronautical objects 216.

Figure 3:
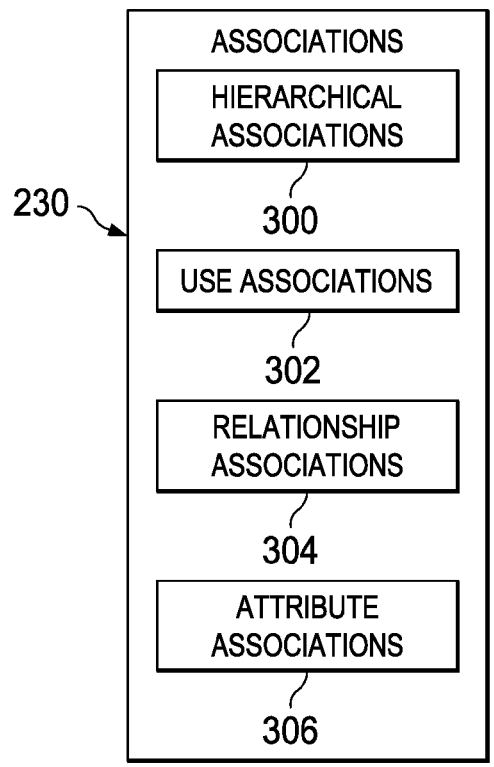
FIG. 3 is an illustration of a block diagram of associations for aeronautical objects in accordance with an illustrative embodiment.

Turning next to FIG. 3, an illustration of a block diagram of associations for aeronautical objects is depicted in accordance with an illustrative embodiment. As depicted, associations 230 for aeronautical objects 216 may take a number of different forms. Associations 230 may be used to implement taxonomies and ontologies for aeronautical objects 216.

In the illustrative examples, associations 230 may be based on at least one of hierarchical associations 300, use associations 302, relationship associations 304, attribute associations 306, and other suitable types of associations between aeronautical objects 216. Hierarchical associations 300 are associations in which aeronautical objects have a hierarchy with respect to each other. One aeronautical object may be on a higher level than another aeronautical object.

For example, a first aeronautical object may be an airport. Other aeronautical objects may be on a lower hierarchy to the first aeronautical object. For example, a second aeronautical object that may be on a lower level than an airport may be runways. Runways may be an aeronautical object having additional aeronautical objects on a lower level. For example, aeronautical objects representing specific runways may be on a level lower in the hierarchy than the second aeronautical object for runways.

Use associations 302 are associations based on one aeronautical object using another aeronautical object. For example, one aeronautical object may be an airport with another aeronautical object being a procedure used by the airport.

Relationship associations 304 are any associations between objects that may have some relevancy to each other. For example, in a terminal procedure aeronautical object, an aeronautical object identifying frequencies for communicating with the airport for which the procedure is to be performed may be present.

Attribute associations are associations between aeronautical objects based on attributes of the aeronautical objects. Associations may be made based on common attributes. A common attribute is an attribute shared by more than one aeronautical object. For example, a common attribute that may be used for associations may be runways having a north bearing, waypoints for terminal use, and other suitable attributes.

In yet another illustrative example, the attribute in attribute associations may be based on geographic features. For example, aeronautical objects may be associated with each other if the aeronautical objects are within a specific geographic region. The geographic region may be, for example, without limitation, a state, an airspace around an airport, or some other suitable geographic region.

Of course, other types of associations may be present in associations 230. The associations illustrated in FIG. 3 are only meant to illustrate some of the types of associations that may be used to associate aeronautical objects to each other.

Figure 4:
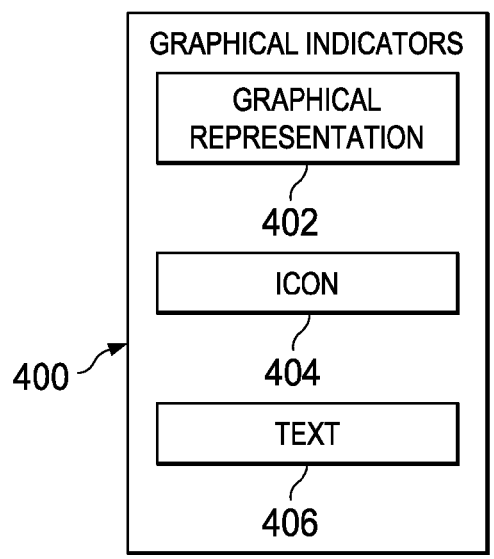
FIG. 4 is an illustration of a number of graphical indicators in accordance with an illustrative embodiment.

With reference now to FIG. 4, an illustration of a number of graphical indicators is depicted in accordance with an illustrative embodiment. In this illustrative example, graphical indicators 400 are examples of graphical indicators that may be used to display aeronautical objects 216 in FIG. 2.

For example, graphical indicators 400 may include first number of graphical indicators 221 and second number of graphical indicators 225.

In this illustrative example, graphical indicators 400 include graphical representation 402, icon 404, text 406, and other suitable types of graphical indicators. In one illustrative example, graphical representation 402 may be used when an aeronautical object is for a physical, real world object. For example, graphical representation 402 may be a graphic of a runway used to represent an aeronautical object for a runway. In another illustrative example, graphical representation 402 may be used to represent the concept. For example, if the aeronautical object is for a procedure, graphical representation 402 also may be used. Graphical representation 402 may illustrate a runway and a path with respect to a runway at an airport.

Graphical representation 402 also may be used to represent other aeronautical objects. Graphical representation 402 may be a graphic identifying a flight path. This graphic may be displayed with respect to another aeronautical object for which the aircraft is to fly. Of course, other types of graphical representations may be used depending on the type of aeronautical object.

Icon 404 is a graphical indicator used to indicate the identity of the aeronautical object. Icon 404 may include symbols commonly used for charts for different objects. Text 406 may be used alone or in combination with other graphical indicators. Text 406 may be used with graphical representation 402 or icon 404 to provide a better identification of the aeronautical object. For example, text 406 may be displayed in a label in association with graphical representation 402 or icon 404.

The illustrations of graphical indicators 400 in FIG. 4 are only meant as examples of how aeronautical objects can be displayed on a graphical user interface and are not meant to limit the manner in which aeronautical objects may be represented in a graphical user interface.

With respect to FIGS. 5-13, when aeronautical objects are discussed as being displayed on a graphical user interface, that display is made with reference to the display of graphical indicators for those aeronautical objects. For example, if reference is made to the display of an aeronautical object of an airport, that means a graphical indicator representing the aeronautical object is displayed. The display of the icon provides a visual representation of the aeronautical object in a graphical user interface to an operator. Thus, the use of a graphical indicator is present even though not directly mentioned when discussing the display of aeronautical objects in FIGS. 5-13.

Figure 5:
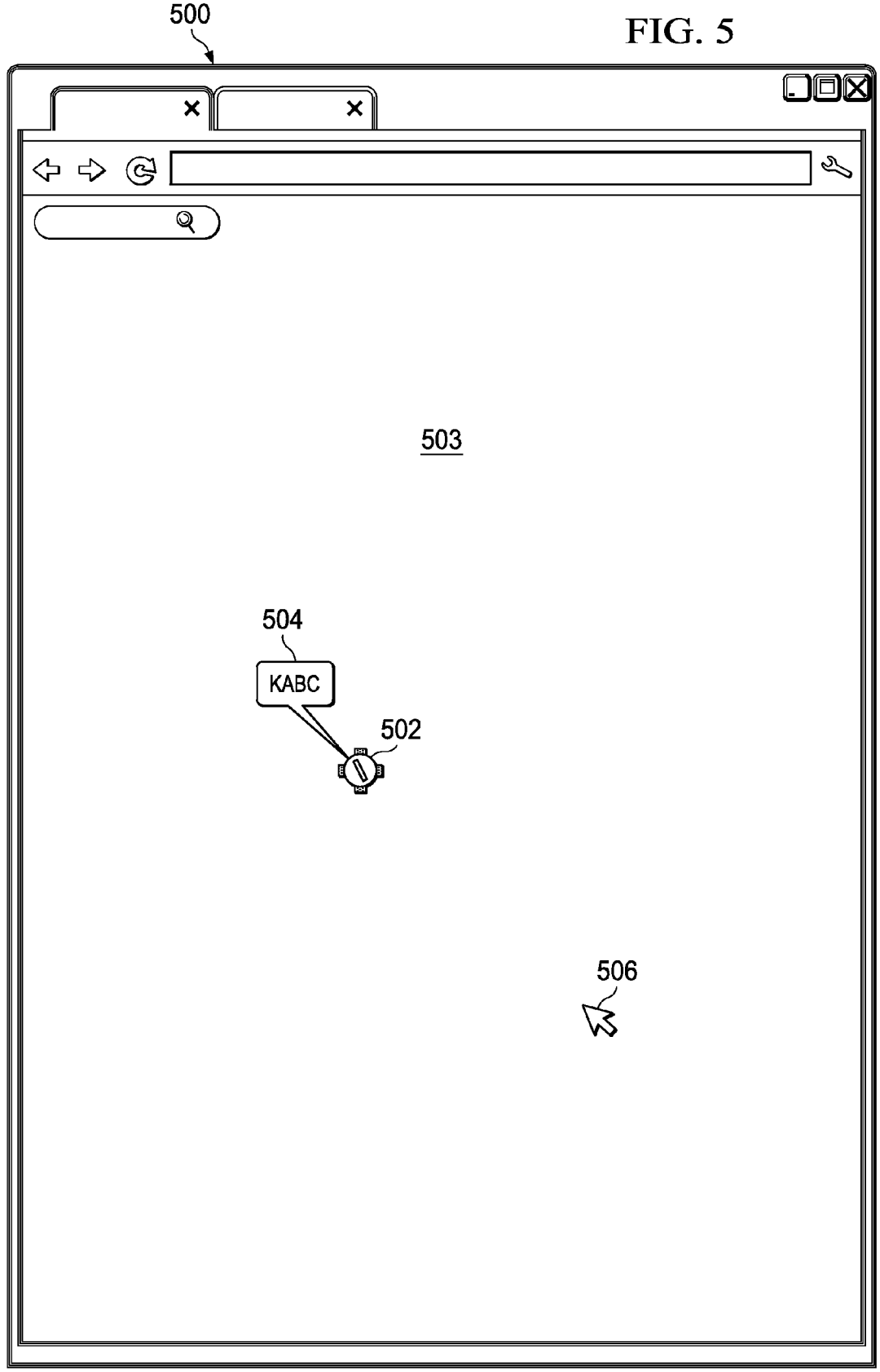
FIG. 5 is an illustration of a graphical user interface in accordance with an illustrative embodiment.

With reference now to FIG. 5, an illustration of a graphical user interface is depicted in accordance with an illustrative embodiment. In this illustrative example, graphical user interface 500 is an example of an implementation of graphical user interface 218 in FIG. 2.

As depicted, aeronautical object 502 is displayed on chart 503 in graphical user interface 500. Aeronautical object 502 is for an airport in this illustrative example. Label 504 is an additional graphical indicator used to identify aeronautical object 502. Aeronautical object 224 in FIG. 2 is displayed in graphical user interface 500 through the use of aeronautical object 502. The manipulation of aeronautical object 502 may result in the manipulation of aeronautical object 224.

In these illustrative examples, the user may move pointer 506 to a position relative to aeronautical object 502 and generate user input to select aeronautical object 502. Pointer 506 may be moved using a user input device. This user input device may be, for example, a mouse, a keyboard, a trackball, a touch screen, a joystick, and other suitable types of user input devices.

Figure 6:
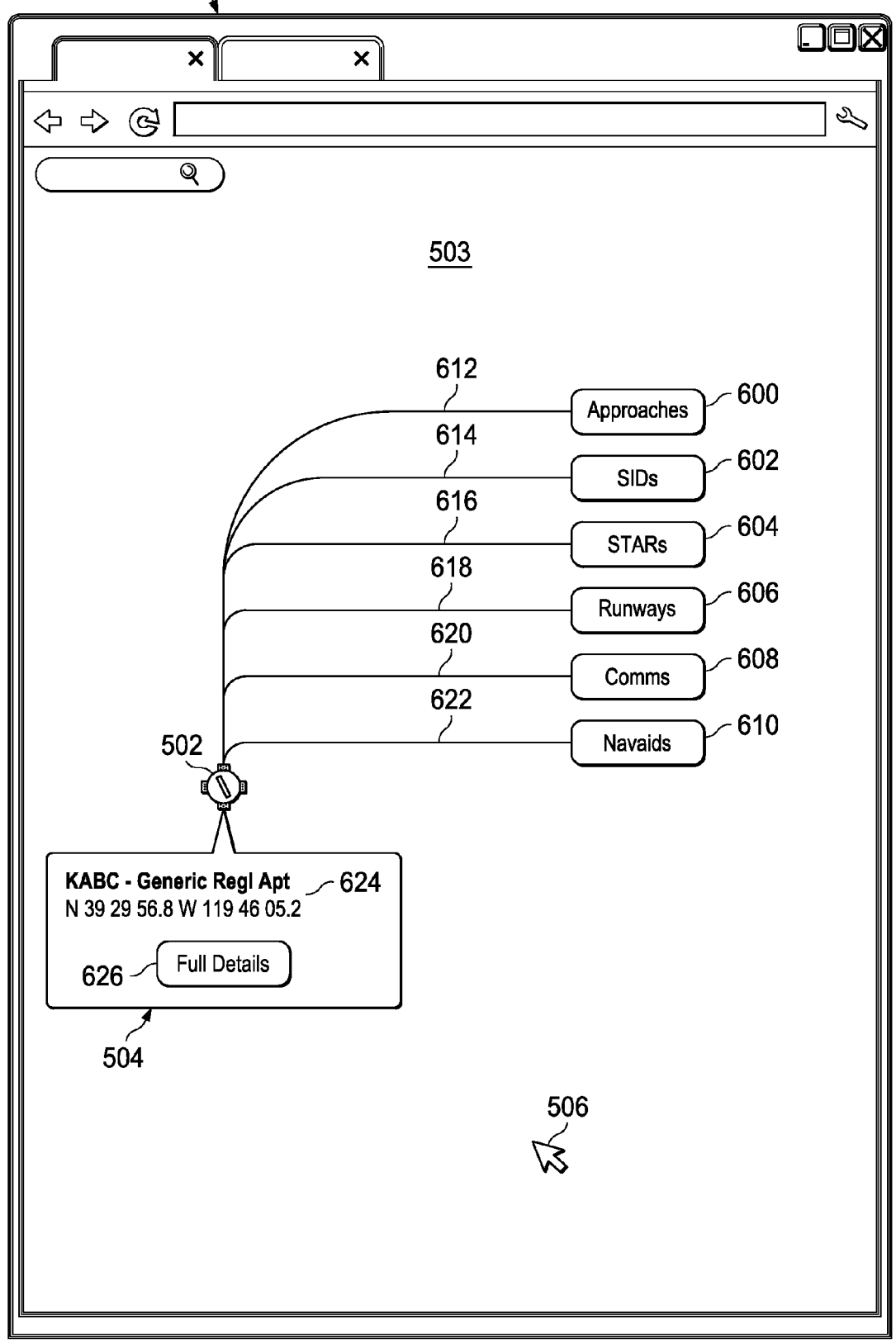
FIG. 6 is an illustration of aeronautical objects displayed in a graphical user interface in accordance with an illustrative embodiment.

Turning now to FIG. 6, an illustration of aeronautical objects displayed in a graphical user interface is depicted in accordance with an illustrative embodiment. In this depicted example, aeronautical objects 600, 602, 604, 606, 608, and 610 are displayed in response to a selection of aeronautical object 502. Aeronautical object 600 represents approaches for the airport. Aeronautical object 602 represents standard instrument departure (SID) procedures for the airport. Aeronautical object 604 represents standard terminal arrival route (STAR) procedures for the airport. Aeronautical object 606 represents runways at the airport. Aeronautical object 608 represents communications frequencies for the airport. Aeronautical object 610 represents navigational aids for the airport.

As depicted, aeronautical objects 600, 602, 604, 606, 608, and 610 are displayed on chart 503. This display is made without the user having to move to a different chart, add views, or change views in graphical user interface 500.

In this illustrative example, the associations between aeronautical object 502 and aeronautical objects 600, 602, 604, 606, 608, and 610 are provided in graphical user interface through the use of graphical indicators 612, 614, 616, 618, 620, and 622, respectively. These graphical indicators connect aeronautical object 502 to the corresponding aeronautical objects displayed in response to the selection of aeronautical object 502. In other words, these graphical indicators provide a visual connection to associate aeronautical objects 502 with aeronautical objects 600, 602, 604, 606, 608, and 610.

Additionally, the selection of aeronautical object 502 also results in information 624 being displayed in label 504 in these illustrative examples. A portion of the information for aeronautical object 502 is displayed. Additional information may be obtained by selecting control 626 within label 504.

Figure 7:
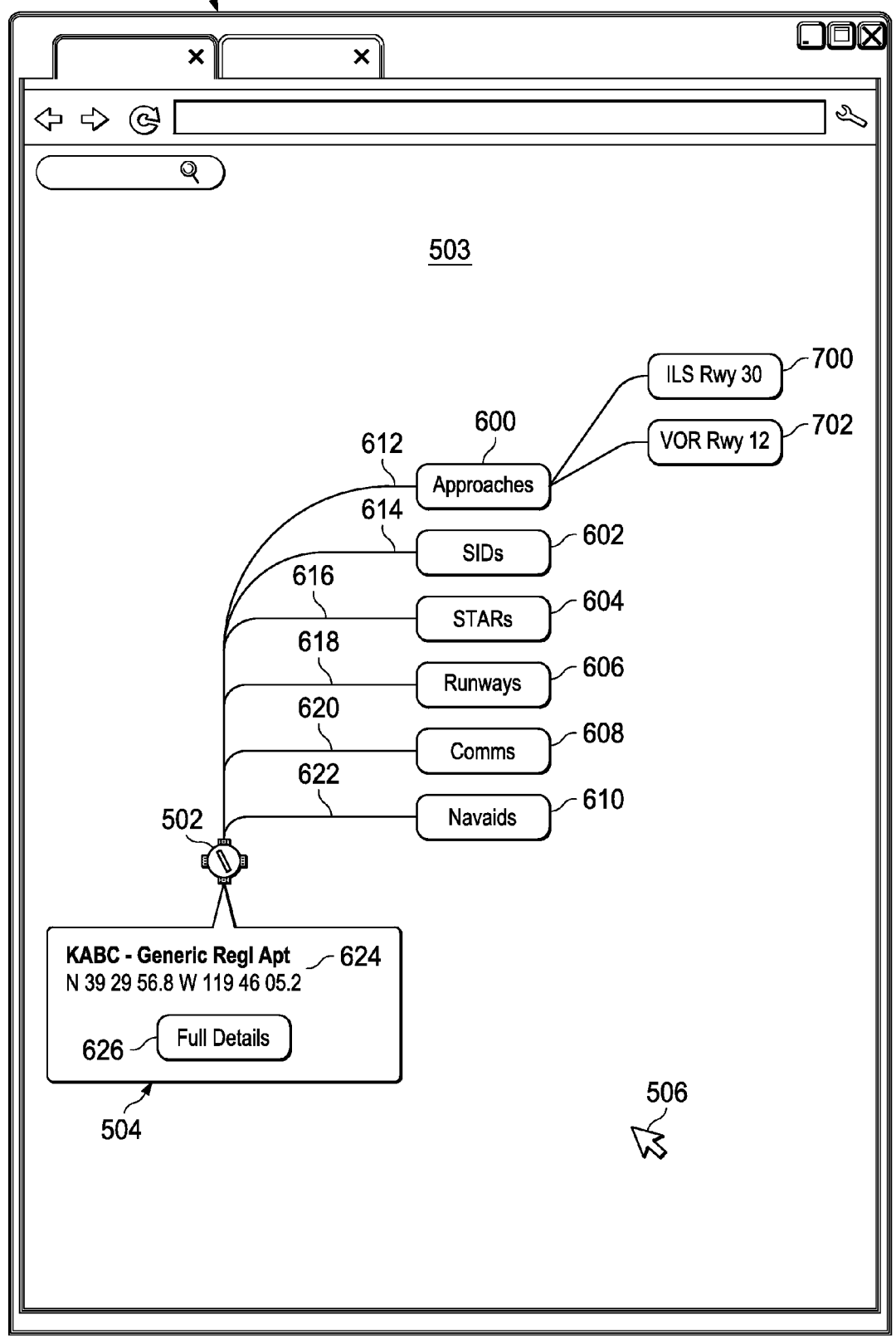
FIG. 7 is an illustration of a change in display of aeronautical objects in response to user input in accordance with an illustrative embodiment.

Turning next to FIG. 7, an illustration of a change in display of aeronautical objects in response to user input is depicted in accordance with an illustrative embodiment. As depicted, user input has been received to select aeronautical object 600. A selection of aeronautical object 600 results in aeronautical object 700 and aeronautical object 702 being displayed. These aeronautical objects represent particular approaches within aeronautical object 600.

Figure 8:
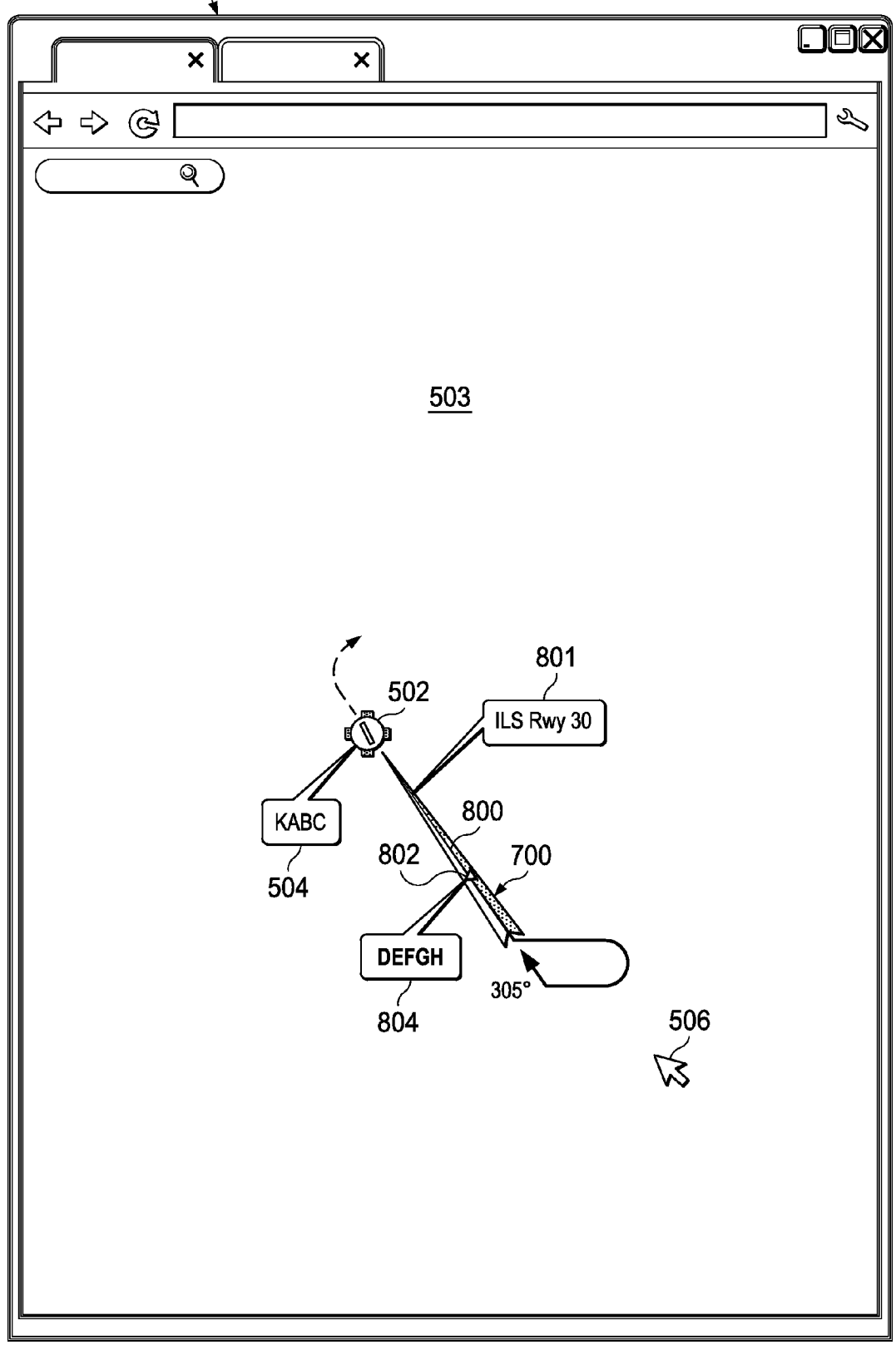
FIG. 8 is an illustration of a graphical user interface with the display of aeronautical objects in accordance with an illustrative embodiment.

With reference now to FIG. 8, an illustration of a graphical user interface with the display of aeronautical objects is depicted in accordance with an illustrative embodiment. In this illustrative example, aeronautical object 700 in FIG. 7 has been selected.

The selection of aeronautical object 700 in FIG. 7 results in a display of aeronautical object 700 using graphical representation 800 in addition to displaying label 801 for aeronautical object 700. In this manner, graphical representation 800 provides a visualization of aeronautical object 700.

In this illustrative example, graphical representation 800 is a graphical representation of an approach to the airport represented by aeronautical object 502. This graphical representation of aeronautical object 700 provides the user an ability to visualize a spatial relationship between aeronautical object 700 and aeronautical object 502.

In other words, aeronautical object 700 is displayed in a location with respect to aeronautical object 502 in graphical user interface 500. This location is with respect to the location of aeronautical object 502 on chart 503. Further, the orientation of graphical representation 800 for aeronautical object 502 is made such that a user is able to identify a spatial relationship between these two aeronautical objects with respect to each other.

In this particular example, the display of aeronautical object 700 with graphical representation 800 provides a user the ability to identify the spatial relationship of the approach displayed by graphical representation 800 for aeronautical object 700 relative to aeronautical object 502, which is an airport. In other words, graphical representation 800 has a spatial relationship to aeronautical object 502.

Graphical representation 800 is displayed on the chart in the representative geographic location relative to the airport represented by aeronautical object 502. Further, the display of graphical representation 800 may be scaled with respect to the scale for the current display of chart 503 in graphical user interface 500.

In this illustrative example, aeronautical object 802 also is displayed with respect to aeronautical object 700 and aeronautical object 502. Label 804 identifies aeronautical object 802. In this illustrative example, aeronautical object 802 is the waypoint DEFGH. The display of aeronautical object 802 in graphical user interface 500 is made in a manner that allows a user to see the spatial relationship between the aeronautical object 802 for the waypoint, the aeronautical object 700 for the procedure, and the aeronautical object 502 for the airport.

In these illustrative examples, an operator is able to see the locations of the different aeronautical objects with respect to each other in graphical user interface 500.

Further, other aeronautical objects have been removed from chart 503 in graphical user interface 500 after aeronautical object 700 is selected. The other aeronautical objects are removed to reduce clutter or unnecessary information. The unnecessary information is identified based on the user input selecting aeronautical object 700.

The removal of aeronautical objects, such as aeronautical object 702 in this illustrative example, may be performed at different times in response to different user inputs. The removal of aeronautical objects may be, for example, made when a graphic representation of a physical object represented by the aeronautical object is made, when some number of aeronautical objects are displayed in graphical user interface 500, or based on some other suitable situation.

Figure 9:
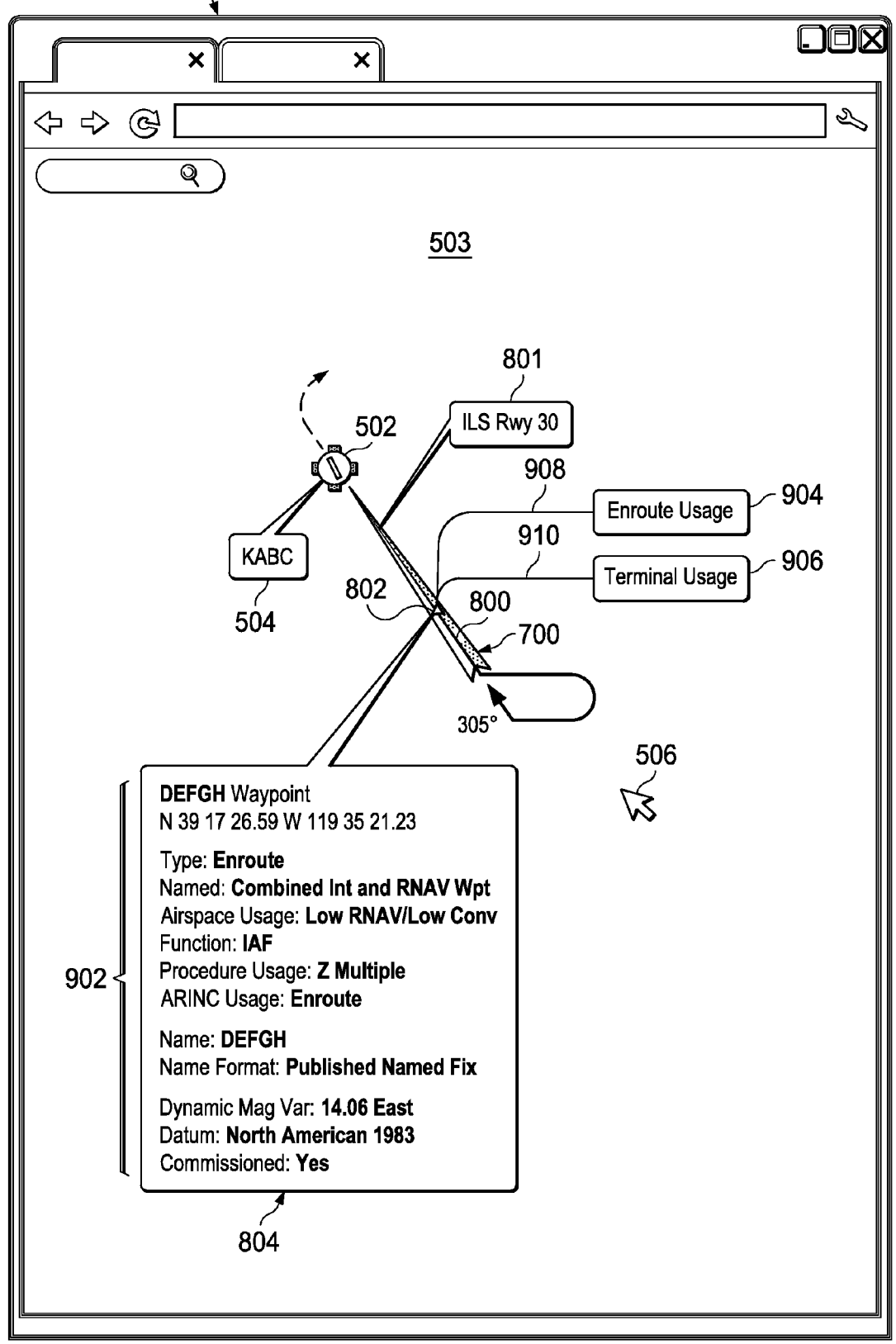
FIG. 9 is an illustration of a graphical user interface with aeronautical objects in accordance with an illustrative embodiment.

Turning now to FIG. 9, an illustration of a graphical user interface with aeronautical objects is depicted in accordance with an illustrative embodiment. In this illustrative example, aeronautical object 802 has been selected. A selection of this aeronautical object results in information 902 being displayed in label 804. Additionally, aeronautical object 904 and aeronautical object 906 are displayed.

As can be seen in this example, graphical indicator 908 provides an identification of the relationship between aeronautical object 802 and aeronautical object 904. Graphic indicator 910 provides an indication of the association between aeronautical objects 802 and aeronautical object 906.

Figure 10:
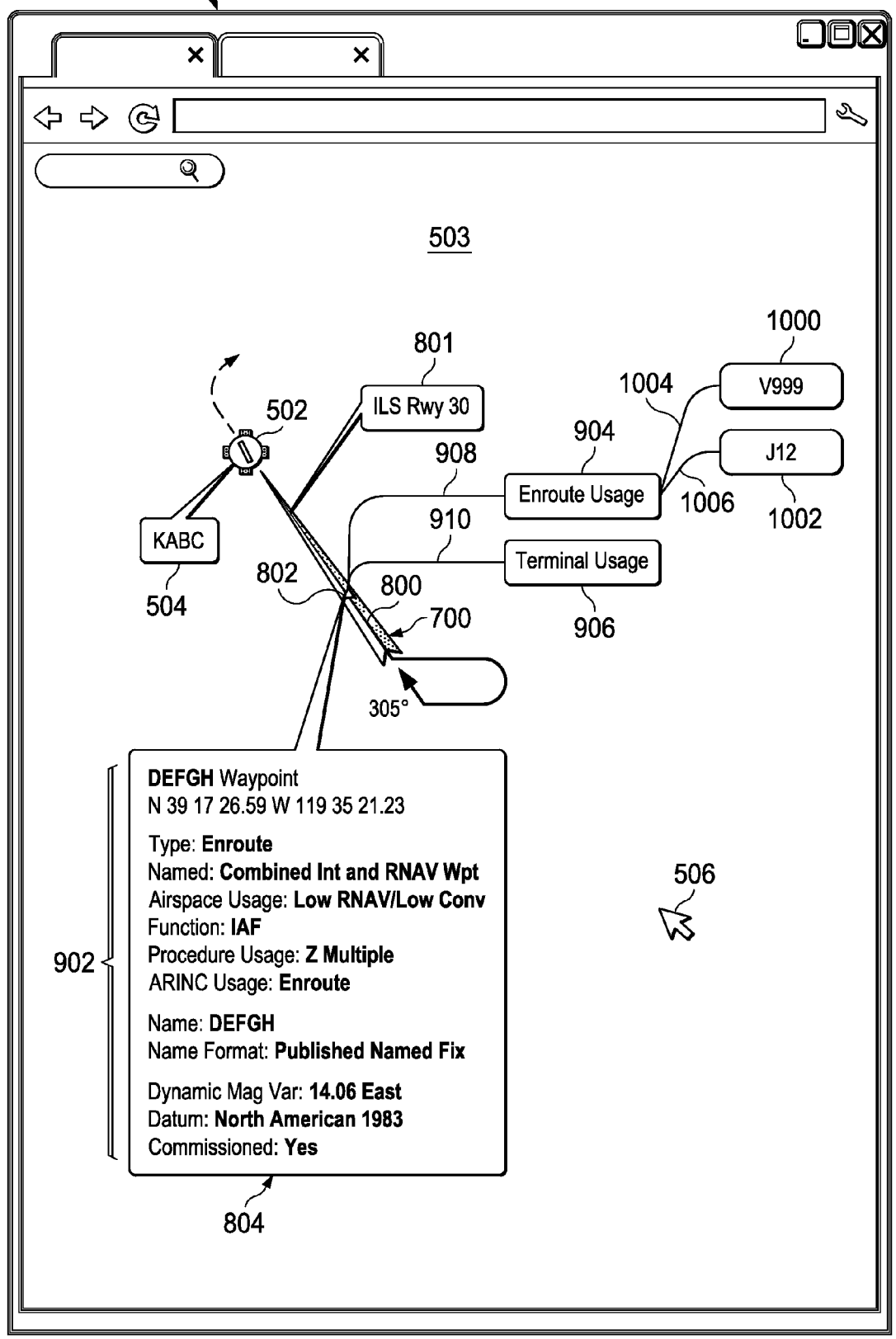
FIG. 10 is an illustration of a graphical user interface with aeronautical objects in accordance with an illustrative embodiment.

With reference to FIG. 10, an illustration of a graphical user interface with aeronautical objects is depicted in accordance with an illustrative embodiment. In this illustrative example, aeronautical object 904 has been selected through user input. Selection of aeronautical object 904 results in the display of aeronautical object 1000 and aeronautical object 1002.

These aeronautical objects are ones that are associated with aeronautical object 904. Graphical indicator 1004 illustrates the association between aeronautical object 904 and aeronautical object 1000. Graphical indicator 1006 illustrates the association between aeronautical object 904 and aeronautical object 1002.

Figure 11:
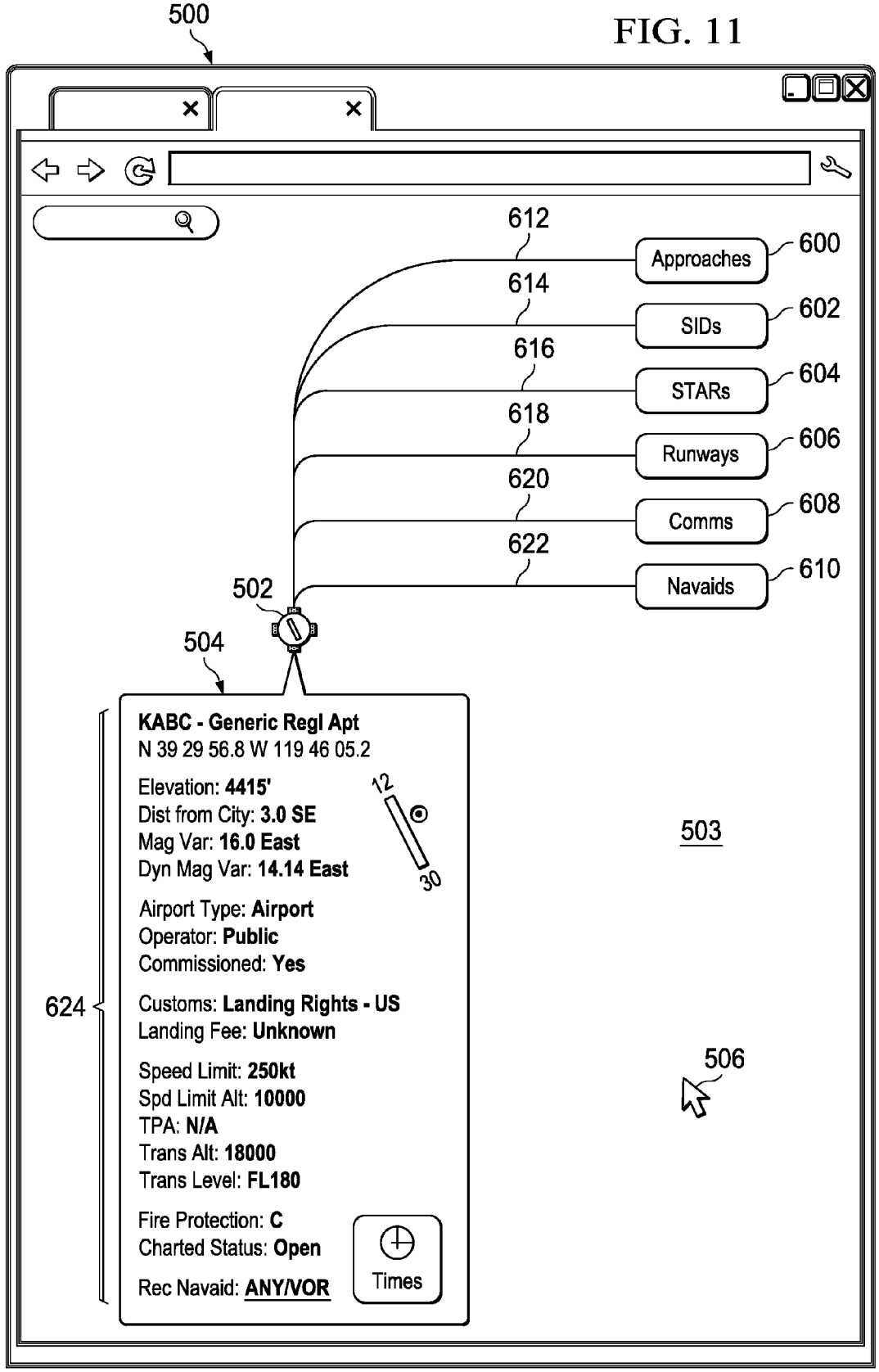
FIG. 11 is an illustration of a display of information associated with an aeronautical object in a graphical user interface in accordance with an illustrative embodiment.

With reference to FIG. 11, an illustration of a display of information associated with an aeronautical object in a graphical user interface is depicted in accordance with an illustrative embodiment. In this illustrative example, control 626 in label 504 from FIG. 5 has been selected. As a result, additional information about aeronautical object 502 is displayed within label 504.

Additionally, one or more of these aeronautical objects may be removed from graphical user interface 500. User input may be entered by an operator to remove aeronautical objects that may not be of interest for a current operation for an aircraft. In this manner, an operator may further reduce the amount of aeronautical information displayed in graphical user interface 500.

As can be see with respect to FIGS. 5-11, the amount of aeronautical information displayed on graphical user interface 500 may be controlled by an operator. The operator may navigate through aeronautical information and display aeronautical objects of interest. Other aeronautical objects of similar types, but not relevant to operations for the aircraft, may be omitted from graphical user interface 500. In this manner, an operator may more easily identify and perform operations for an aircraft.

Figure 12:
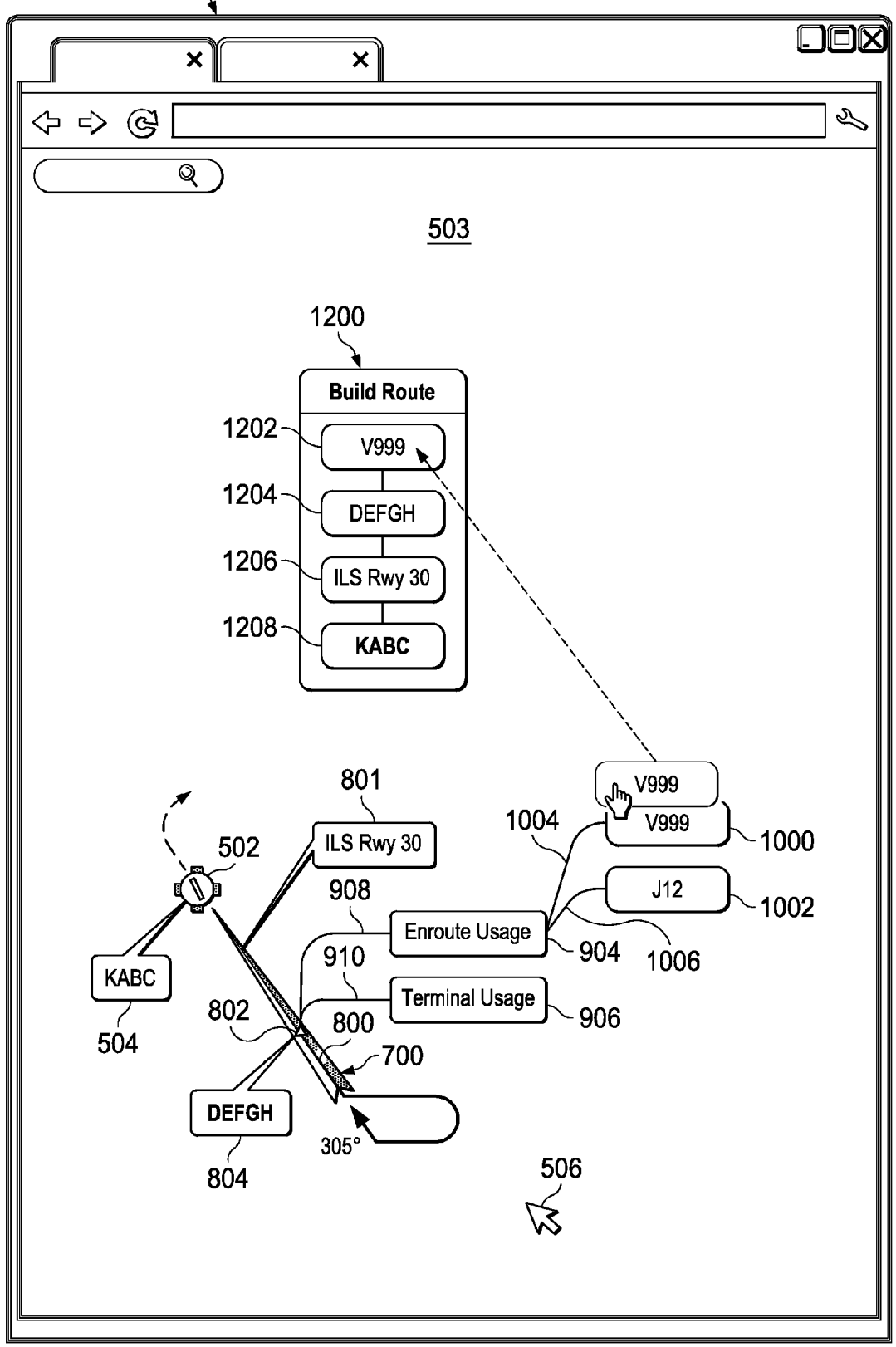
FIG. 12 is an illustration of building a route from aeronautical objects in accordance with an illustrative embodiment.

With reference now to FIG. 12, an illustration of building a route from aeronautical objects is depicted in accordance with an illustrative embodiment. In this illustrative example, work area 1200 is used to build a route through the selection of aeronautical objects. As can be seen in this illustrative example, aeronautical objects have been placed into work area 1200.

Icons 1202, 1204, 1206, and 1208 are present in work area 1200. Icon 1202 represents graphical representation 800; icon 1204 represents aeronautical object 802; icon 1206 represents aeronautical object 700; and icon 1208 represents aeronautical object 502.

The selection of these aeronautical objects may be made using various operations by double-clicking, drag and drop, and other types of user input on the graphical indicators for these aeronautical objects. In this manner, a route may be created by an operator in the same graphical user interface as the information being displayed. Creating a route using graphical user interface 500 may be performed more quickly and more accurately when the user is able to see the information that is selected along with the associations between the different aeronautical objects.

Figure 13:
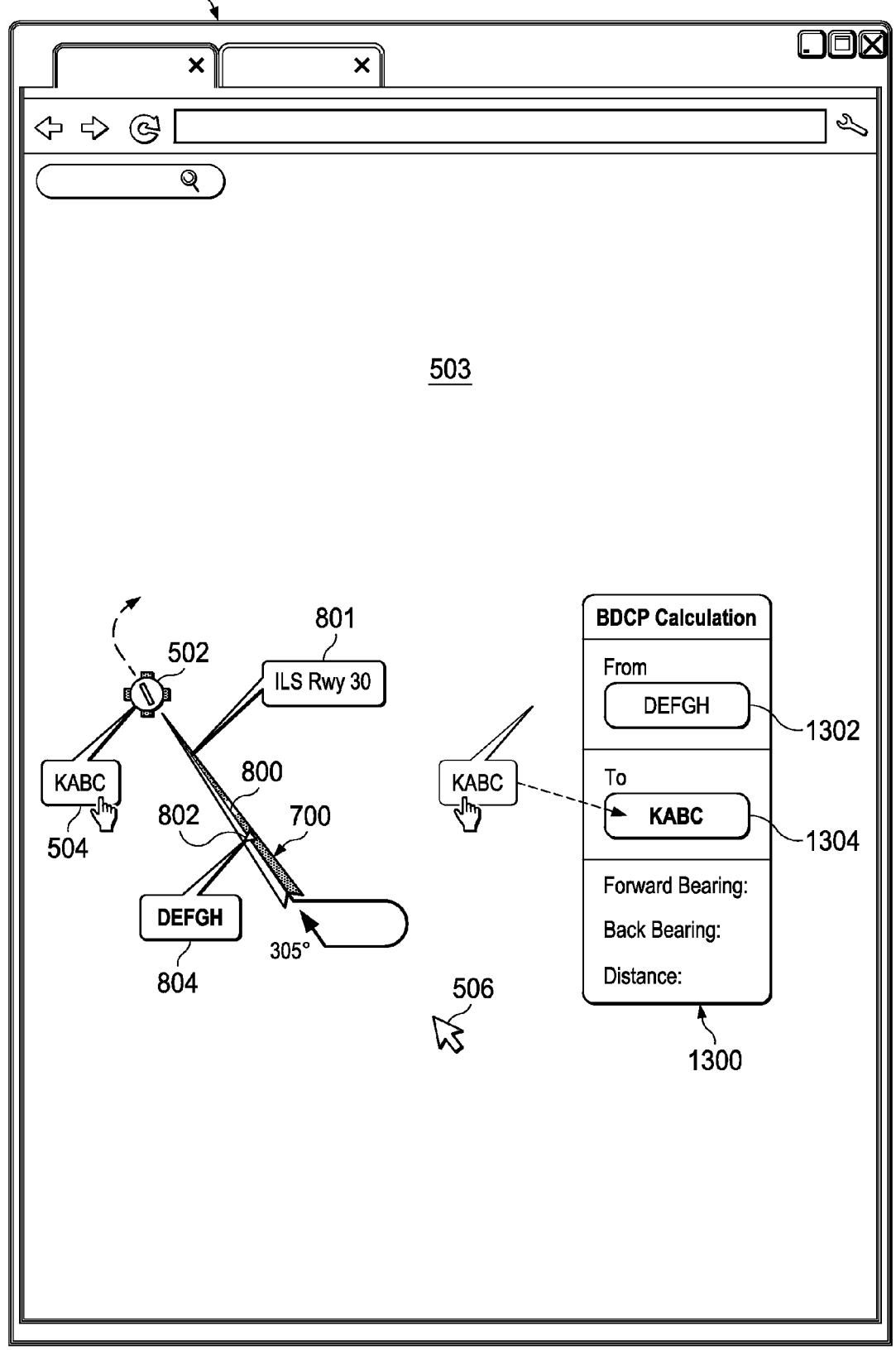
FIG. 13 is an illustration of a calculation in a graphical user interface in accordance with an illustrative embodiment.

With reference now to FIG. 13, an illustration of a calculation in a graphical user interface is depicted in accordance with an illustrative embodiment. In this illustrative example, work area 1300 performs a calculation to identify a forward bearing, a back bearing, and a distance. In this illustrative example, icon 1302 represents a selection of aeronautical object 802.

Icon 1304 represents a selection of aeronautical object 502. With the selection of these two graphical objects, a calculation may be performed in work area 1300. In these illustrative examples, the calculations are performed by a computer-implemented process in response to the selection of the graphical objects. In other words, an operator does not need to perform the calculations directly but receives the results when selecting locations from aeronautical objects displayed in graphical user interface 500.

The illustration of graphical user interface 500 in FIGS. 5-13 are not meant to imply physical or architectural limitations to a manner in which different illustrative embodiment may be implemented. For example, in other illustrative embodiments other types of icons may be used to represent aeronautical objects in addition to the ones illustrated. Further, when an aeronautical object is selected, the focus of the aeronautical object may be changed. As another example, terrain, cities, and other geographical information also may be displayed in graphical user interface 500 depending on the particular implementation. This type of information was not illustrated in these examples to avoid obscuring the illustration of different features in one or more of the illustrative embodiments.

Figures 14, 15:
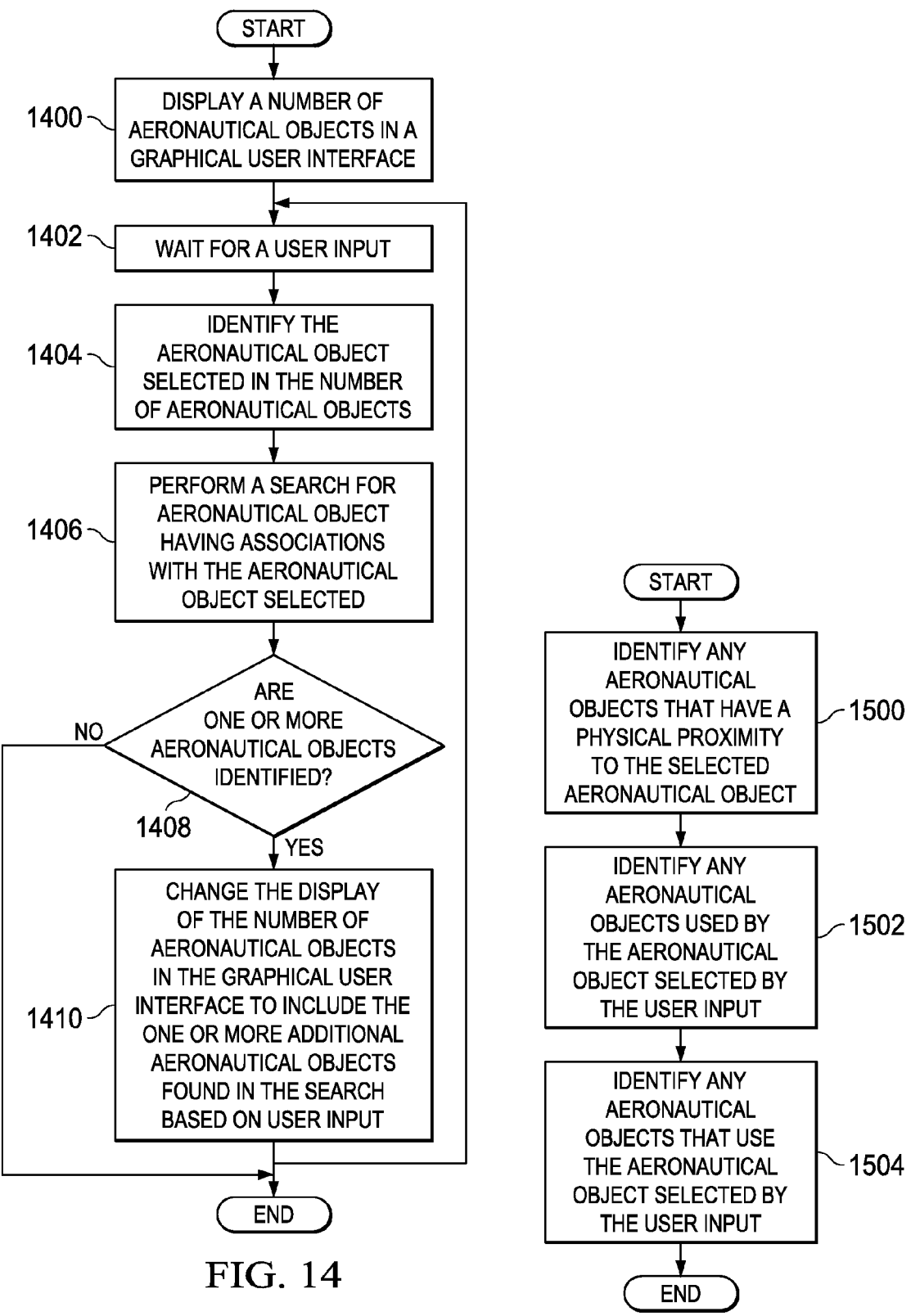
FIG. 14 is an illustration of a flowchart of a process for displaying aeronautical objects for managing operations of an aircraft in accordance with an illustrative embodiment.
FIG. 15 is an illustration of a flowchart for identifying aeronautical objects in accordance with an illustrative embodiment.

Turning next to FIG. 14, an illustration of a flowchart of a process for displaying aeronautical objects for managing operations of an aircraft is depicted in accordance with an illustrative embodiment. The process in FIG. 14 may be implemented in navigation information system 200 in FIG. 2. In particular, this process may be implemented in information module 214 in FIG. 2. The process may be implemented using hardware, software, or a combination of the two.

The process begins by displaying a number of aeronautical objects in a graphical user interface (operation 1400). In this illustrative example, the number of aeronautical objects may be displayed on a chart in the graphical user interface.

The process waits for a user input (operation 1402). In these illustrative examples, the user input is a selection of an aeronautical object.

When a user input is received, the process identifies the aeronautical object selected in the number of aeronautical objects (operation 1404). A search for aeronautical objects having associations with the aeronautical object selected is performed (operation 1406).

A determination is made as to whether one or more aeronautical objects are identified from the search (operation 1408).

If one or more aeronautical objects are identified, the process changes the display of the number of aeronautical objects in the graphical user interface to include the one or more additional aeronautical objects found in the search based on the user input (operation 1410). The process then returns to operation 1402. The aeronautical objects in the number of aeronautical objects have a number of associations with each other. The change in the display of the number of aeronautical objects may also include removing one or more aeronautical objects from the number of aeronautical objects.

The display of the number of aeronautical objects in operation 1410 includes a number of graphical indicators. The number of graphical indicators provides a visualization of the number of associations or the number of aeronautical objects.

With reference now to FIG. 15, an illustration of a flowchart for identifying aeronautical objects is depicted in accordance with an illustrative embodiment. The process illustrated in FIG. 15 is an illustration of one manner in which operation 1406 in FIG. 14 may be implemented.

The process begins by identifying any aeronautical objects having a physical proximity to the selected aeronautical object (operation 1500). In operation 1500, the process looks for aeronautical objects that may be within some selected distance of the aeronautical object selected from the number of aeronautical objects by the user input.

The process then identifies any aeronautical objects used by the aeronautical object selected by the user input (operation 1502). The process then identifies any aeronautical objects that use the aeronautical object selected by the user input (operation 1504) with the process terminating thereafter.

These identifications may be made by searching aeronautical objects in a database such as aeronautical objects 216 in FIG. 2. In some cases, no aeronautical objects may be identified. Of course, other identifications may be made in addition to or in place of the ones illustrated in these examples. In still other illustrative examples, fewer identifications may be made depending on the particular implementation.

Turning next to FIG. 16, an illustration of a flowchart of a process for displaying aeronautical objects in a graphical user interface is depicted in accordance with an illustrative embodiment. The process illustrated in FIG. 16 may be used each time aeronautical objects are displayed in a graphical user interface. For example, this process may be implemented in operation 1400 and in operation 1404 in FIG. 14 as illustrative examples.

The process begins by selecting an unprocessed aeronautical object from a number of aeronautical objects (operation 1600). The process then determines whether a spatial relationship is present for the aeronautical object (operation 1602) in relation to another aeronautical object that is to be displayed in the graphical user interface. For example, the aeronautical object may be a waypoint and another aeronautical object may be a flight path. The waypoint may have a particular location on the flight path. Locations of these two aeronautical objects may be located in a geographic location on a chart.

If the aeronautical object has a spatial relationship, the process identifies a location on a chart in the graphical user interface to display the aeronautical object (operation 1604). In operation 1604, the location is selected to provide a visual display of the spatial relationship with respect to any other aeronautical objects associated with the selected aeronautical object.

The process then displays the aeronautical object (operation 1606). A determination is made as to whether an additional unprocessed aeronautical object is present (operation 1608). If an additional unprocessed aeronautical object is present, the process returns to operation 1602. Otherwise, the process terminates.

With reference again to operation 1602, if a spatial relationship is not present for the aeronautical object, the process identifies an association for the aeronautical object (operation 1610). This association is an association other than a spatial relationship. For example, the association may be based on a hierarchical association, a use association, a relationship association, an attribute association, and other suitable types of associations. The process then selects a location for the aeronautical object in the graphical user interface (operation 1612). In operation 1612, the process may select a location based on the association. In other examples, the location may be selected based on providing increased understandability and reducing clutter in the display. The process then proceeds to operation 1606 as described above.

Turning next to FIG. 17, an illustration of a flowchart of a process for managing aeronautical information is depicted in accordance with an illustrative embodiment. The process illustrated in FIG. 17 may be implemented navigation information system 200 in FIG. 2. In particular, this process may be implemented in information module 214 in FIG. 2. This process may be used to manage aeronautical information 210 in performing information management 246.

The process begins by displaying aeronautical information (operation 1700). A display of aeronautical information may be performed using processes illustrated in FIGS. 14-16. The process receives user input (operation 1702). This user input may manipulate the navigation information displayed in operation 1700. The process identifies the user input (operation 1704). In this illustrative example, the user input may be to navigate or modify the navigation information.

If the user input is to navigate the aeronautical information, the process returns to operation 1700 to display aeronautical information based on the user input. If the user input is to modify the navigation information the process modifies the navigation information (operation 1706) with the process then returns to operation 1700 as described above. This process may continue until the operator is finished navigating or modifying the aeronautical information.

In modifying navigation information in operation 1706, a number of different modifications may be made. For example, without limitation, the modification may be to add an aeronautical object, delete an aeronautical object, modify an aeronautical object, or make other suitable changes. In modifying an aeronautical object, the information in an aeronautical object may be changed. The modification also may involve changing associations with other aeronautical objects as well as other suitable changes.

In this manner, an operator may create databases for aeronautical information, validate aeronautical information, and make changes to aeronautical information as needed. The process illustrated in FIG. 17 may be used to update aeronautical information as updates or changes are identified. Thus, one or more of the different illustrative embodiments may be used in situations other than for managing the operation of an aircraft or planning flights.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 18, an illustration of a data processing system is depicted in accordance with an illustrative embodiment. In this illustrative example, data processing system 1800 includes communications framework 1802, which provides communications between processor unit 1804, memory 1806, persistent storage 1808, communications unit 1810, input/output (I/O) unit 1812, and display 1814. Data processing system 1800 may be used to implemented one or more computers in number of computers 206 in computer system 202 in FIG. 2.

Processor unit 1804 serves to execute instructions for software that may be loaded into memory 1806. Processor unit 1804 may be a number of processors, a multi-processor core, or some other type of processor, depending on the particular implementation. A number, as used herein with reference to an item, means one or more items. Further, processor unit 1804 may be implemented using a number of heterogeneous processor systems in which a main processor is present with secondary processors on a single chip. As another illustrative example, processor unit 1804 may be a symmetric multi-processor system containing multiple processors of the same type.

Memory 1806 and persistent storage 1808 are examples of storage devices 1816. A storage device is any piece of hardware that is capable of storing information, such as, for example, without limitation, data, program code in functional form, and/or other suitable information either on a temporary basis and/or a permanent basis. Storage devices 1816 may also be referred to as computer readable storage devices in these examples. Memory 1806, in these examples, may be, for example, a random access memory or any other suitable volatile or non-volatile storage device. Persistent storage 1808 may take various forms, depending on the particular implementation.

For example, persistent storage 1808 may contain one or more components or devices. For example, persistent storage 1808 may be a hard drive, a flash memory, a rewritable optical disk, a rewritable magnetic tape, or some combination of the above. The media used by persistent storage 1808 also may be removable. For example, a removable hard drive may be used for persistent storage 1808.

Communications unit 1810, in these examples, provides for communications with other data processing systems or devices. In these examples, communications unit 1810 is a network interface card. Communications unit 1810 may provide communications through the use of either or both physical and wireless communications links.

Input/output unit 1812 allows for input and output of data with other devices that may be connected to data processing system 1800. For example, input/output unit 1812 may provide a connection for user input through a keyboard, a mouse, touch screen, and/or some other suitable input device. Further, input/output unit 1812 may send output to a printer. Display 1814 provides a mechanism to display information to a user.

Instructions for the operating system, applications, and/or programs may be located in storage devices 1816, which are in communication with processor unit 1804 through communications framework 1802. In these illustrative examples, the instructions are in a functional form on persistent storage 1808. These instructions may be loaded into memory 1806 for execution by processor unit 1804. The processes of the different embodiments may be performed by processor unit 1804 using computer implemented instructions, which may be located in a memory, such as memory 1806.

These instructions are referred to as program code, computer usable program code, or computer readable program code that may be read and executed by a processor in processor unit 1804. The program code in the different embodiments may be embodied on different physical or computer readable storage media, such as memory 1806 or persistent storage 1808.

Program code 1818 is located in a functional form on computer readable media 1820 that is selectively removable and may be loaded onto or transferred to data processing system 1800 for execution by processor unit 1804. Program code 1818 and computer readable media 1820 form computer program product 1822 in these examples. In one example, computer readable media 1820 may be computer readable storage media 1824 or computer readable signal media 1826. Computer readable storage media 1824 may include, for example, an optical or magnetic disk that is inserted or placed into a drive or other device that is part of persistent storage 1808 for transfer onto a storage device, such as a hard drive, that is part of persistent storage 1808.

Computer readable storage media 1824 also may take the form of a persistent storage, such as a hard drive, a thumb drive, or a flash memory, that is connected to data processing system 1800. In some instances, computer readable storage media 1824 may not be removable from data processing system 1800. In these examples, computer readable storage media 1824 is a physical or tangible storage device used to store program code 1818 rather than a medium that propagates or transmits program code 1818. Computer readable storage media 1824 is also referred to as a computer readable tangible storage device or a computer readable physical storage device. In other words, computer readable storage media 1824 is a media that can be touched by a person.

Alternatively, program code 1818 may be transferred to data processing system 1800 using computer readable signal media 1826. Computer readable signal media 1826 may be, for example, a propagated data signal containing program code 1818. For example, computer readable signal media 1826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1818 may be downloaded over a network to persistent storage 1808 from another device or data processing system through computer readable signal media 1826 for use within data processing system 1800. For instance, program code stored in a computer readable storage medium in a server data processing system may be downloaded over a network from the server to data processing system 1800. The data processing system providing program code 1818 may be a server computer, a client computer, or some other device capable of storing and transmitting program code 1818.

The different components illustrated for data processing system 1800 are not meant to provide architectural limitations to the manner in which different embodiments may be implemented. The different illustrative embodiments may be implemented in a data processing system including components in addition to or in place of those illustrated for data processing system 1800.

Other components shown in FIG. 18 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1804 may take the form of a hardware unit that has circuits that are manufactured or configured for a particular use. This type of hardware may perform operations without needing program code to be loaded into a memory from a storage device to be configured to perform the operations.

For example, when processor unit 1804 takes the form of a hardware unit, processor unit 1804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, a programmable array logic, a field programmable logic array, a field programmable gate array, and other suitable hardware devices. With this type of implementation, program code 1818 may be omitted because the processes for the different embodiments are implemented in a hardware unit.

In still another illustrative example, processor unit 1804 may be implemented using a combination of processors found in computers and hardware units. Processor unit 1804 may have a number of hardware units and a number of processors that are configured to run program code 1818. With this depicted example, some of the processes may be implemented in the number of hardware units, while other processes may be implemented in the number of processors.

In another example, a bus system may be used to implement communications framework 1802 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 1806, or a cache, such as found in an interface and memory controller hub that may be present in communications framework 1802.

The different illustrative embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters, which are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art.

Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing operations of an aircraft, the method comprising:
   displaying an icon representing a first aeronautical object in a graphical user interface, wherein the first aeronautical object manages the operations of the aircraft, and wherein the icon is one of an approach for an airport, a runway, or a waypoint;
   responsive to a user input to the icon, displaying a group of text boxes each connected by a line to the icon, wherein each text box comprises a second aeronautical object, and wherein each second aeronautical object in each text box has an association with the first aeronautical object; and
   responsive to a user input of a selection of a text box in the group of text boxes, removing the icon and unselected text boxes from the graphical user interface, and displaying a new icon representing the second aeronautical object of the selected text box.

2. The method of claim 1, wherein the group of text boxes are a first group of text boxes, the method further comprising:
   responsive to the user input to the selected text box of the first group of text boxes, displaying a second group of text boxes connected by a line to the selected text box of the first group of text boxes, wherein each textbox in the second group of text boxes comprise a third aeronautical object having an association to the second aeronautical object of the selected text box of the first group of text boxes.

3. The method of claim 2, further comprising:
   responsive to a user input to a selected text box in the second group of text boxes, displaying a third group of text boxes connected by a line to the selected text box in the second group of text boxes, wherein each textbox in the third group comprise a fourth aeronautical object having an association with the third aeronautical object of the selected text box in the second group of text boxes.

4. The method of claim 2, further comprising:
   displaying a number of graphical indicators that visually identify the association between the second aeronautical object and the third aeronautical object.

5. The method of claim 1, further comprising:
   displaying information for the icon in the graphical user interface.

6. The method of claim 1, further comprising:
   displaying a chart in the graphical user interface.

7. The method of claim 1, further comprising:
   responsive to the user input to the selected textbox, removing the group of text boxes from display in the graphical user interface, and displaying a graphical representation of the second aeronautical object of the selected textbox.

8. The method of claim 1, wherein the first and second aeronautical objects have a number of associations selected from one or more of a hierarchical association, a use association, a relationship association, and an attribute association.

9. The method of claim 1, wherein the operations are selected from one or more of building a route and performing a calculation.

10. The method of claim 1, further comprising:
managing the first and second aeronautical objects in an aeronautical database, wherein managing the aeronautical objects comprises one or more of:
creating an aeronautical object in the aeronautical database, deleting the aeronautical object in the aeronautical database, and modifying the aeronautical object in the aeronautical database.

11. The method of claim 1, wherein the second aeronautical object comprises one or more of a standard instrument departure (SID) procedures for an airport and a standard terminal arrival route (STAR) procedures for the airport.

12. An apparatus for managing operations of an aircraft comprising;
a display system configured to display a graphical user interface;
a computer system configured to:
display an icon representing a first aeronautical object in the graphical user interface, wherein the first aeronautical objects manages the operations of the aircraft, and wherein the icon is one of an approach for an airport, a runway, or a waypoint;
responsive to a user input to the icon, display a group of text boxes each connected by a line to the icon, wherein each text box comprises a second aeronautical object, and wherein each second aeronautical object in each text box has an association with the first aeronautical object; and
responsive to a user input of a selection of a text box in the group of text boxes, remove the icon and unselected text boxes from the graphical user interface, and display a new icon representing the second aeronautical object of the selected text box.

13. The apparatus of claim 12, wherein the group of text boxes is a first group of text boxes, and wherein the computer system is further configured to:
responsive to the user input to the selected text box of the first group of text boxes, display a second group of text boxes connected by a line to the selected text box of the first group of text boxes, wherein each textbox in the second group of text boxes comprises a third aeronautical object having an association to the second aeronautical object of the selected text box of the first group of text boxes.

14. The apparatus of claim 13, wherein the computer system is further configured to:
responsive to a user input to a selected text box in the second group of text boxes, display a third group of text boxes connected by a line to the selected text box in the second group of text boxes, wherein each textbox in the third group comprises a fourth aeronautical object having an association with the third aeronautical object of the selected text box in the second group of text boxes.

15. The apparatus of claim 13, wherein the computer system is further configured to:
display a number of graphical indicators that visually identify the association between the second aeronautical object and the third aeronautical object.

16. The apparatus of claim 12, wherein the computer system is further configured to:
display information for the icon in the graphical user interface.

17. The apparatus of claim 12, wherein the computer system is further configured to:
display a chart in the graphical user interface.

18. The apparatus of claim 12, wherein the computer system is further configured to:
responsive to the user input to the selected textbox, remove from display the group of text boxes, and display a graphical representation of the second aeronautical object of the selected textbox.

19. The apparatus of claim 12, wherein the first and second aeronautical objects have a number of associations with one another, the number of associations selected from one or more of a hierarchical association, a use association, a relationship association, and an attribute association.

20. The apparatus of claim 12, wherein the operations are selected from one or more of building a route and performing a calculation.

21. The apparatus of claim 12, further comprising an aeronautical database, wherein the computer system is further configured to perform one or more of:
create an aeronautical object in the aeronautical database, delete the aeronautical object in the aeronautical database, and modify the aeronautical object in the aeronautical database.

22. The apparatus of claim 12, wherein the second aeronautical object comprises one or more of a standard instrument departure (SID) procedures for an airport and a standard terminal arrival route (STAR) procedures for the airport.

* * * * *